United States Patent
Sareen et al.

(10) Patent No.: US 10,341,258 B2
(45) Date of Patent: Jul. 2, 2019

(54) DYNAMIC ADJUSTMENT OF CONNECTION PRIORITY IN NETWORKS

(71) Applicant: Ciena Corporation, Hanover, MD (US)

(72) Inventors: Jatin Sareen, New Delhi (IN); Darek Skalecki, Ottawa (CA); Gerard L. Swinkels, Ottawa (CA)

(73) Assignee: Ciena Corporation, Hanover, MD (US)

( * ) Notice: Subject to any disclaimer, the term of this patent is extended or adjusted under 35 U.S.C. 154(b) by 268 days.

(21) Appl. No.: 15/352,843

(22) Filed: Nov. 16, 2016

(65) Prior Publication Data

US 2017/0317953 A1 Nov. 2, 2017

Related U.S. Application Data

(63) Continuation-in-part of application No. 15/144,137, filed on May 2, 2016, now Pat. No. 9,800,325.

(30) Foreign Application Priority Data

Oct. 4, 2016 (IN) .............................. 201614033887

(51) Int. Cl.
| | | |
|---|---|---|
| H04B 10/00 | (2013.01) | |
| H04L 12/947 | (2013.01) | |
| H04L 12/801 | (2013.01) | |
| H04B 10/032 | (2013.01) | |
| H04Q 11/00 | (2006.01) | |
| H04J 14/00 | (2006.01) | |

(52) U.S. Cl.
CPC ............ *H04L 49/25* (2013.01); *H04B 10/032* (2013.01); *H04L 47/10* (2013.01); *H04Q 11/0062* (2013.01); *H04Q 11/0067* (2013.01); *H04Q 2011/0064* (2013.01); *H04Q 2011/0079* (2013.01); *H04Q 2011/0081* (2013.01)

(58) Field of Classification Search
CPC .. H04B 10/32; H04J 14/0287; H04J 14/0289; H04J 14/0291; H04J 14/0293; H04J 14/0295
See application file for complete search history.

(56) References Cited

U.S. PATENT DOCUMENTS

| | | | |
|---|---|---|---|
| 6,814,912 B2 | 11/2004 | Ausen et al. | |
| 7,304,947 B2 | 12/2007 | Skalecki et al. | |
| 7,376,086 B1 | 5/2008 | Paraschiv | |
| 7,590,051 B1 | 9/2009 | Skalecki et al. | |

(Continued)

OTHER PUBLICATIONS

"Generalized Multi-Protocol Label Switching (GMPLS) Architecture", Network Working Group, Oct. 2004, pp. 1-69.

(Continued)

*Primary Examiner* — Daniel G Dobson
(74) *Attorney, Agent, or Firm* — Clements Bernard Walker PLLC; Christopher L. Bernard; Lawrence A. Baratta, Jr.

(57) ABSTRACT

Systems and methods for dynamic adjustment of a connection's priority in a network include configuring the connection with a dynamic priority and setting a current priority based on one or more factors, wherein the connection is a Layer 0 connection, a Layer 1 connection, and a combination thereof; detecting an event in the network requiring a change to the current priority, wherein the event changes the one or more factors; and causing a change in the current priority of the connection based on the event.

20 Claims, 19 Drawing Sheets

(56) References Cited

U.S. PATENT DOCUMENTS

| | | |
|---|---|---|
| 7,639,631 B2 | 12/2009 | Ashwood-Smith et al. |
| 7,774,474 B2 | 8/2010 | Ashwood-Smith et al. |
| 7,995,569 B2 | 8/2011 | Ashwood-Smith et al. |
| 8,125,925 B2 | 2/2012 | Skalecki et al. |
| 8,166,183 B2 | 4/2012 | Swinkels et al. |
| 8,402,121 B2 | 3/2013 | Skalecki et al. |
| 8,553,707 B2 | 10/2013 | Swinkels et al. |
| 8,593,961 B2 | 11/2013 | Skalecki et al. |
| 8,750,141 B2 | 6/2014 | Skalecki et al. |
| 8,817,798 B2 | 8/2014 | Skalecki et al. |
| 8,854,955 B2 | 10/2014 | Prakash et al. |
| 9,118,421 B2 | 8/2015 | Swinkels et al. |
| 9,124,960 B2 | 9/2015 | Swinkels et al. |
| 9,191,280 B2 | 11/2015 | Swinkels et al. |
| 2004/0076151 A1* | 4/2004 | Fant ................ H04J 3/085 370/389 |
| 2008/0008085 A1* | 1/2008 | Gerstel ............. H04L 12/14 370/216 |
| 2008/0281987 A1 | 11/2008 | Skalecki et al. |
| 2011/0222394 A1 | 9/2011 | Swinkels et al. |
| 2011/0222862 A1 | 9/2011 | Boertjes et al. |
| 2014/0147107 A1 | 5/2014 | Swinkels et al. |

OTHER PUBLICATIONS

"MPLS Traffic Engineering Soft Preemption", Internet Engineering Task Force (IETF), Jan. 2010, pp. 1-13.
"Architecture for the automatically switched optical network", International Telecommunication Union, Feb. 2012, pp. 1-124.

\* cited by examiner

DYNAMIC ADJUSTMENT OF CONNECTION PRIORITY IN NETWORKS

CROSS-REFERENCE TO RELATED APPLICATION(S)

The present patent/application is a continuation-in-part of U.S. patent application Ser. No. 15/144,137, filed on May 2, 2016, and entitled "MESH RESTORABLE SERVICE SYSTEMS AND METHODS WITH PREEMPTIBLE ESTABLISHED BACKUP PATHS," the contents of which are incorporated by reference herein.

FIELD OF THE DISCLOSURE

The present disclosure generally relates to networking systems and methods. More particularly, the present disclosure relates to dynamic adjustment of connection priority in networks, such as control plane, Software Defined Networking (SDN), etc. based networks.

BACKGROUND OF THE DISCLOSURE

Networks, such as using Dense Wave Division Multiplexing (DWDM), Optical Transport Network (OTN), Ethernet, Multiprotocol Label Switching (MPLS), and the like, are deploying control plane systems and methods. Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services or calls in the control plane. Control planes use the available paths to route the services and program the underlying hardware accordingly.

In addition to control planes which are distributed, a centralized method of control exists with Software Defined Networking (SDN) which utilizes a centralized controller. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein. Note, distributed control planes can be used in conjunction with centralized controllers in a hybrid deployment.

Restoration (also referred to as protection) is a key feature in networks where a backup (protection) path takes over for an active (working) path of a service or call when there is a failure in the active path. Restoration can include dedicated, reserved protection paths (e.g., 1+1) for working paths which provide extremely fast restoration (sub-50 ms) at the expense of inefficient bandwidth usage, i.e., the protection paths are active and unused in the network. At the other end of restoration time is mesh restoration which includes computing paths at the time of failures and can lead to several seconds for restoration. Of course, unprotected services can be provisioned without restoration capabilities. Various techniques are used in between these extremes (dedicated protection and mesh restoration with path computation upon failures) to balance the inefficient use of bandwidth versus restoration time. Of course, in terms of restoration, the goal is to minimize restoration time while concurrently minimizing the inefficient use of bandwidth. It would be advantageous to support dedicated protection paths which provide the advantage of quick restoration time, without the disadvantage of inefficient bandwidth usage.

MPLS offers backup path capabilities via Fast Reroute (FRR), but these backup paths, when established in the network, are established at the same priority as the active path. Thus, network operators in MPLS must be careful not to exhaust all of the free network bandwidth for backup paths to leave some bandwidth available for dynamic reroutes (mesh restoration). In mesh restoration, such as for control planes like ASON, GMPLS, and OSRP, leading techniques include pre-calculation of mesh restoration paths, without establishing these paths. Note, mesh networks are typically engineered to have some spare bandwidth available for use when failures occur, but this is less than previous ring-based techniques which had dedicated spare bandwidth (e.g., 50% of the bandwidth). Pre-calculation saves only a small amount of restoration time because the overall traffic recovery time is governed by the time it takes to signal and establish a new path in the network, i.e., path computation time is only a small fraction of the overall connection establishment time. That is, pre-calculated routes in mesh restoration save a little time. Again, it would be advantageous to have the restoration time of already established backup paths while not stranding this bandwidth for use in the network.

In networks with control planes, SDN, etc., connections can be assigned priority levels which are used for preemption in restoration, service creation, and the like. In particular, the connections can be Layer 0 (wavelengths), Layer 1 (Time Division Multiplexed (TDM), Layer 2 (Ethernet, MPLS, etc.), or a combination thereof. For example, in digitally multiplexed optical networks, connection priorities can be configured during creation and these priorities are static for the life of the connection. High priority connections can be restored immediately such as through mesh restoration whereas low priority connections can be restored after a hold off period or the like to enable the high priority connections an opportunity to obtain resources first. This conventional approach leads to non-intelligent behavior, i.e., current information is not utilized to make intelligent decisions about what should be restored immediately or delayed. For example, if may make sense to delay a high priority connection to allow many additional needier connections an opportunity. Various other situations are also seen. That is, it is inefficient to make decisions at run time based on previously configured static priorities.

Disadvantages of this static priority approach include the following. For static high priority connections, when such connections' paths are path protected, restoration would already be done by this path protection rather than mesh restoration, thus it does not make sense to mesh restore such as connection since other needier connections' could get delayed. Static high priority first restoration is always a "greedy" connection approach which is not optimal from network performance perspective, since ideally only connections should mesh restore first which would result in traffic restoration. For static low priority connections, often path protected connections (which may be high priority) are set to low priority due to the additional path protection. However, when path protection is not available (e.g., because of fault in other leg not restored), mesh restoration is low priority (delayed restoration) resulting in high traffic restoration times. This approach is always "courteous" to other connection in network, which is not optimal for connection itself when restoration would result in traffic restoration (because of protection not being available).

BRIEF SUMMARY OF THE DISCLOSURE

In an exemplary embodiment, a method for dynamic adjustment of a connection's priority in a network includes configuring the connection with a dynamic priority and setting a current priority based on one or more factors, wherein the connection is a Layer 0 connection, a Layer 1 connection, and a combination thereof; detecting an event in the network requiring a change to the current priority, wherein the event changes the one or more factors; and causing a change in the current priority of the connection based on the event. The method can further include, responsive to a fault associated with the connection, performing mesh restoration for the connection based on the current priority. The method can further include, responsive to a request for another connection which requires resources associated with the connection, determining preemption of the connection based on the current priority. The causing the change can include one of one of control plane signaling and data plane signaling along the connection's path in the network to change the current priority at each node in the path, and centralized distribution of the change to each node in the path from one of a controller and a management system.

The causing can update a priority attribute at each node along the connection's path and is non-service affecting. The current priority can be utilized to determine mesh restoration behavior for the connection, wherein the connection has one of path protection and another protection mechanism in addition to mesh restoration, and wherein the requiring the change can be based on a state of one of the path protection and the another protection mechanism. The connection can be a Layer 1 connection which is on a Layer 0 connection supporting an optical protection scheme, and wherein the current priority can be set based on the event including a change in state of the optical protection scheme. The connection can include a backup path for another connection, and wherein the event can include the connection becoming active for the another connection. The event can include network state changes which affect a number of alternate routes for the connection in case of failure and preemption. The event can include changes in traffic utilization on the connection where current priority is set based on an amount of the traffic utilization.

In another exemplary embodiment, an apparatus adapted to dynamically adjust a connection's priority in a network includes circuitry adapted to configure the connection with a dynamic priority and setting a current priority based on one or more factors, wherein the connection is a Layer 0 connection, a Layer 1 connection, and a combination thereof; circuitry adapted to detect an event in the network requiring a change to the current priority, wherein the event changes the one or more factors; and circuitry adapted to cause a change in the current priority of the connection based on the event. The apparatus can further include circuitry adapted to perform mesh restoration for the connection based on the current priority responsive to a fault associated with the connection. The apparatus can further include circuitry adapted to determine preemption of the connection based on the current priority responsive to a request for another connection which requires resources associated with the connection.

The circuitry adapted to cause the change can use one of one of control plane signaling and data plane signaling along the connection's path in the network to change the current priority at each node in the path, and centralized distribution of the change to each node in the path from one of a controller and a management system. The circuitry adapted to cause the change can update a priority attribute at each node along the connection's path and is non-service affecting. The current priority can be utilized to determine mesh restoration behavior for the connection, wherein the connection has one of path protection and another protection mechanism in addition to mesh restoration, and wherein the requiring the change is based on a state of one of the path protection and the another protection mechanism. The connection can be a Layer 1 connection which is on a Layer 0 connection supporting an optical protection scheme, and wherein the current priority can be set based on the event including a change in state of the optical protection scheme. The connection can include a backup path for another connection, and wherein the event can include the connection becoming active for the another connection. The event can include network state changes which affect a number of alternate routes for the connection in case of failure and preemption.

In a further exemplary embodiment, a node adapted to dynamically adjust a connection's priority in a network includes one or more ports; and a controller communicatively coupled to the one or more ports, wherein the controller is adapted to configure the connection with a dynamic priority and setting a current priority based on one or more factors, wherein the connection is a Layer 0 connection, a Layer 1 connection, and a combination thereof, detect an event in the network requiring a change to the current priority, wherein the event changes the one or more factors, and cause a change in the current priority of the connection based on the event.

In an exemplary embodiment, a method, implemented in a node in a network, for a preemptible established backup path for a mesh restorable service includes, responsive to a new service request for the mesh restorable service with the preemptible established backup path, establishing a primary path designated as a current path for the mesh restorable service at a designated priority; establishing a backup path for the mesh restorable service at a lower priority than the designated priority, subject to bandwidth availability in the network; and responsive to a fault affecting the primary path, switching to the backup path and raising a priority of the backup path to the designated priority. The method can further include, responsive to a second new service request for a second service, establishing the second service by computing a route through the network based on a second designated priority of the second service and preempting the backup path if required based on path computation. The method can further include, responsive to mesh restoration of another service, establishing a mesh restored route of the another service by computing a route through the network starting with a lowest priority to find the route and preempting the backup path if required based on path computation.

The method can further include, responsive to preemption of the backup path by another service, establishing a second backup path for the mesh restorable service at the lower priority, subject to bandwidth availability in the network. The method can further include, responsive to bandwidth being unavailable in the network, preventing establishment of the backup path and periodically retrying to compute and establish the backup path. The primary path and the backup path can be both at the node and the switching can include a bridge and select between one another to provide 1+1 path switching. The priority can include a setup priority and a holding priority, the lower priority can include a penultimate value for both the setup priority and the holding priority, and the designated priority can include a top priority to one above the penultimate priority for the setup priority and the holding priority. The raising the priority of the backup path to the designated priority can utilize a data plane to expeditiously upgrade the priority.

In another exemplary embodiment, an apparatus, in a node in a network, for a preemptible established backup path for a mesh restorable service includes circuitry adapted to establish, responsive to a new service request for the mesh restorable service with the preemptible established backup path, a primary path designated as a current path for the mesh restorable service at a designated priority; circuitry adapted to establish a backup path for the mesh restorable service at a lower priority than the designated priority, subject to bandwidth availability in the network; and circuitry adapted to switch, responsive to a fault affecting the primary path, to the backup path and raise a priority of the backup path to the designated priority. The apparatus can further include circuitry adapted to establish, responsive to a second new service request for a second service, the second service by computing a route through the network based on a second designated priority of the second service and preempting the backup path if required based on path computation. The apparatus can further include circuitry adapted to establish, responsive to mesh restoration of another service, a mesh restored route of the another service by computing a route through the network starting with a lowest priority to find the route and preempting the backup path if required based on path computation.

The apparatus can further include circuitry adapted to establish, responsive to preemption of the backup path by another service, a second backup path for the mesh restorable service at the lower priority, subject to bandwidth availability in the network. The apparatus can further include circuitry adapted to periodically retry to compute and establish the backup path, responsive to bandwidth being unavailable in the network. The primary path and the backup path can be both at the node and the switching can include a bridge and select between one another to provide 1+1 path switching. The priority can include a setup priority and a holding priority, the lower priority can include a penultimate value for both the setup priority and the holding priority, and the designated priority can include a top priority to one above the penultimate priority for the setup priority and the holding priority. The priority of the backup path can be raised to the designated priority via a data plane to expeditiously upgrade the priority.

In a further exemplary embodiment, a node in a network adapted to provide a preemptible established backup path for a mesh restorable service includes one or more ports; and a controller communicatively coupled to the one or more ports, wherein the controller is adapted to establish, responsive to a new service request for the mesh restorable service with the preemptible established backup path, a primary path designated as a current path for the mesh restorable service at a designated priority, establish a backup path for the mesh restorable service at a lower priority than the designated priority, subject to bandwidth availability in the network, and switch, responsive to a fault affecting the primary path, to the backup path and raise a priority of the backup path to the designated priority. The controller can be further adapted to establish, responsive to a second new service request for a second service, the second service by computing a route through the network based on a second designated priority of the second service and preempting the backup path if required based on path computation. The controller can be further adapted to establish, responsive to mesh restoration of another service, a mesh restored route of the another service by computing a route through the network starting with a lowest priority to find the route and preempting the backup path if required based on path computation. The controller can be further adapted to establish, responsive to preemption of the backup path by another service, a second backup path for the mesh restorable service at the lower priority, subject to bandwidth availability in the network.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
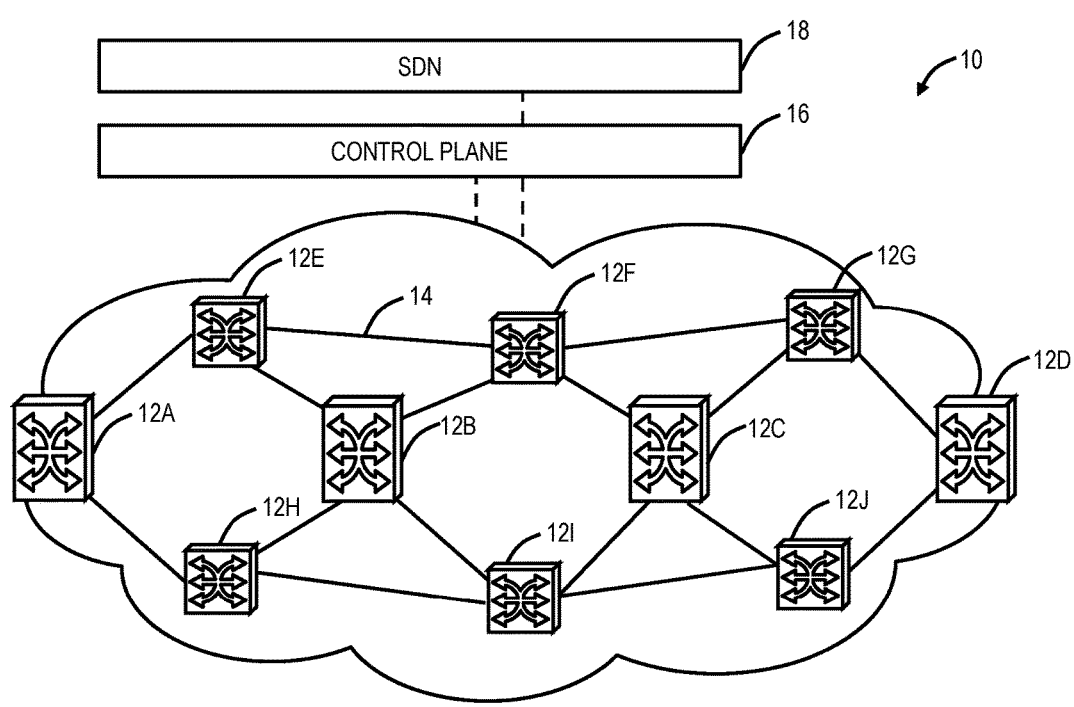
FIG. 1 is a network diagram of an exemplary network with various interconnected nodes.

In various exemplary embodiments, the present disclosure relates to systems and methods for dynamic adjustment of connection priority in networks, such as control plane, Software Defined Networking (SDN), etc. based networks.

The systems and methods remove the conventional constraint of static priority throughout the life of a connection in favor of a dynamic priority which can be adjusted accordingly based on the current state of the network. In an exemplary embodiment, user provisioning can set a connection's priority as dynamic. If such a connection has path protection or some other protection attached to it, the connection can be treated as low priority as the connection is protected already without the need for immediate mesh restoration and keeping this connection low would give other connections more opportunity for resources to mesh restore. However, if it is detected that the path protection or the other protection is unavailable, in poor health, etc., the connection's dynamic priority can be converted from low priority (delayed mesh) to high priority (immediate mesh). This capability of dynamically adapting the connection's priority to recover traffic immediately when its status being unprotected, would give other needier connections a chance to recover uncontested, resulting in more optimal network traffic recovery performance. Similarly, when it is detected that the connection is again protected, after a path stability hold off, it would degrade its priority from high to low again.

In addition to restoration and protection, the dynamic adjustment of priority has various additional applications. The dynamic priority can be used in conjunction with new service creation allowing newer, higher priority connections an opportunity to preempt existing connections. Here, the existing connections can be redialed to find alternative paths or simply removed. The dynamic adjustment can also be used in conjunction with time-of-day, traffic utilization, and the like. Variously, the objective of the dynamic adjustment of priorities enables real-time, intelligent operation of networks such as optical and TDM networks. That is, with intelligence via the control plane and/or SDN, it is not efficient to operate connections with static priorities as this limits action at run time based on the situation at hand. Introducing dynamic adjustments allows the control plane and/or SDN to make intelligent decisions that benefit the network as a whole.

Also, in various exemplary embodiments, mesh restorable service systems and methods are described with preemptible established backup paths. To meet the opposing objectives of minimizing restoration time while minimizing the inefficient use of bandwidth in the network, the systems and methods support already established backup paths in the network (as opposed to only pre-calculated). Further, the already established backup paths are established at a lower priority than the associated active paths, such that the backup paths can be preempted, if needed for another service including a new service or restoration of an existing service, and expeditiously upgraded to high priority if the backup paths become active due to an event or failure in the network. Thus, the systems and methods minimize restoration time since the backup paths are active in the network, thereby addressing the largest time contributor to the restoration time, namely path establishment. Concurrently, the systems and methods allow preemption of the backup paths due to their lower priority, while causing the backup paths to expeditiously switch to a higher priority as they become active.

Exemplary Network

Figure 2:
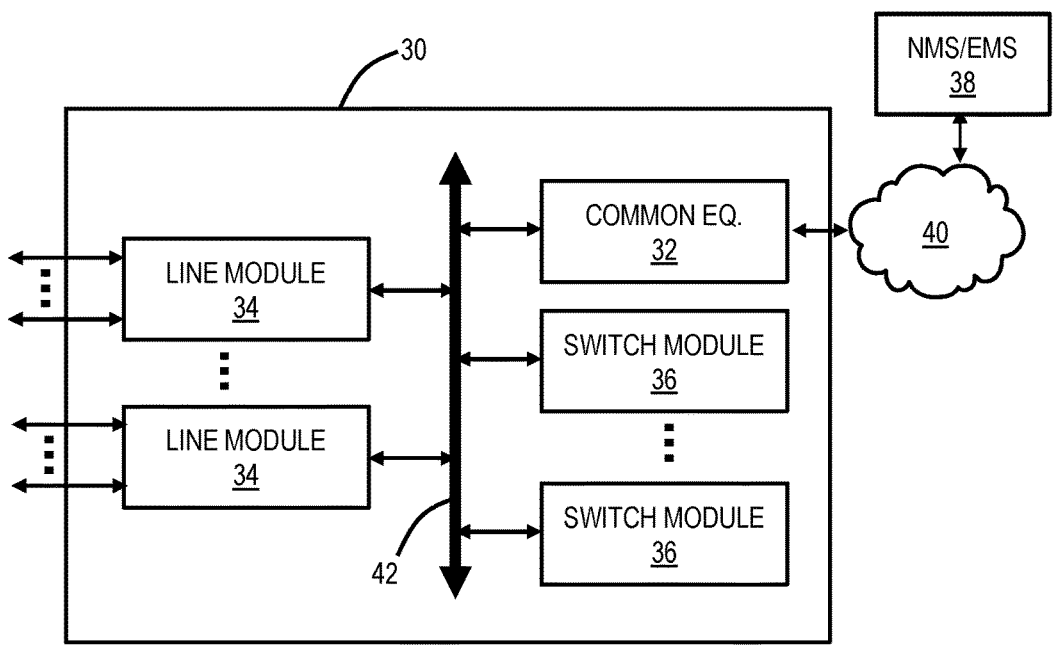
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J). The nodes 12 are interconnected by a plurality of links 14. The nodes 12 communicate with one another over the links 14 through Layer 0 (L0) such as optical wavelengths (DWDM), Layer 1 (L1) such as OTN, Layer 2 (L2) such as Ethernet, MPLS, etc., and/or Layer 3 (L3) protocols. The nodes 12 can be network elements which include a plurality of ingress and egress ports forming the links 14. An exemplary node implementation is illustrated in FIG. 2. The network 10 can include various services or calls between the nodes 12. Each service or call can be at any of the L0, L1, L2, and/or L3 protocols, such as a wavelength, an SNC, an LSP, etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an exemplary embodiment, the control plane 16 can utilize ASON, GMPLS, OSRP, MPLS, Open Shortest Path First (OSPF), Intermediate System-Intermediate System (IS-IS), or the like. Those of ordinary skill in the art will recognize the network 10 and the control plane 16 can utilize any type of control plane for controlling the nodes 12 and establishing, maintaining, and restoring calls or services between the nodes 12.

An SDN controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the systems and methods described herein, the SDN controller 18 can decide which connections should only have pre-computed backup paths and which connections should have pre-allocated backup paths. Such decisions can be based on Service Layer Agreements (SLAs), e.g., connections that have experienced significant outages in recent history can be allotted pre-allocated backup paths as compared to connections which have not recently failed, thus preserving some spare outage time as defined in the SLA.

In the terminology of ASON and OSRP, sub-network connections (SNC) are end-to-end signaled paths or calls since from the point of view of a client signal, each is a single network segment. In GMPLS, the connections are an end-to-end path referred to as LSPs. In SDN, such as in OpenFlow, services are called "flows." In the various descriptions herein, reference is made to SNCs for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

Exemplary Controller

Figure 3:
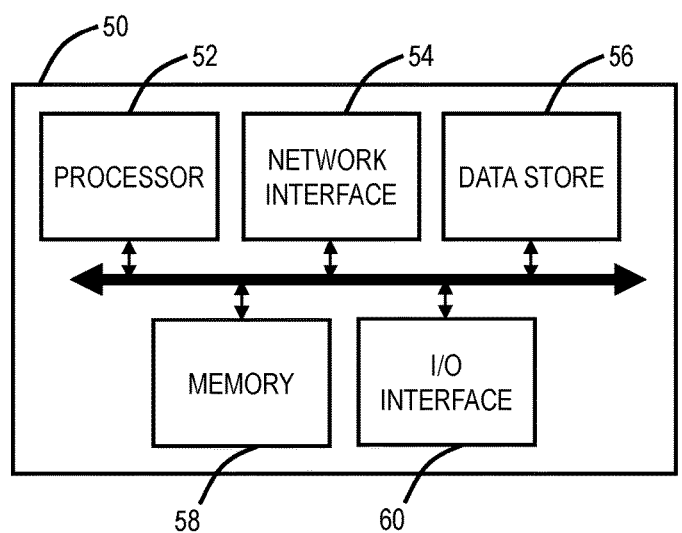
FIG. 3 is a block diagram of a controller to provide control plane processing and/or operations, administration, maintenance, and provisioning (OAM&P) for the node of FIG. 2, and/or to implement a Software Defined Networking (SDN) controller.

Referring to FIG. 3, in an exemplary embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., 10BaseT, Fast Ethernet, Gigabit Ethernet) or a wireless local area network (WLAN) card (e.g., 802.11). The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

Mesh Restorable Service Process with Preemptible Established Backup Paths

Figure 4:
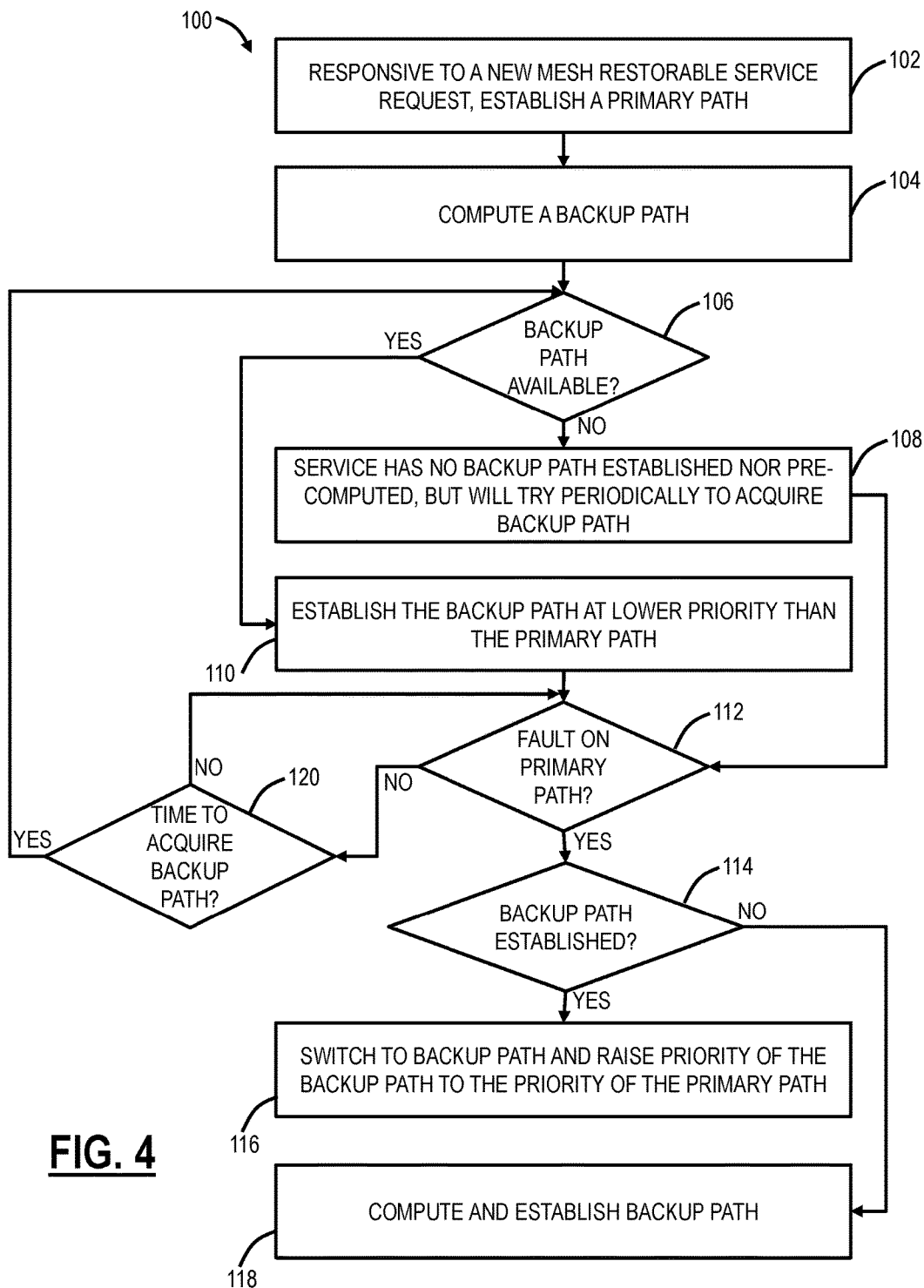
FIG. 4 is a flowchart of a mesh restorable service process with preemptible established backup paths.

Referring to FIG. 4, in an exemplary embodiment, a flowchart illustrates a mesh restorable service process 100 with preemptible established backup paths. The mesh restorable service process 100 contemplates implementation in the network 10, by one or more of the nodes 12, 30, such as via the controller 50. Of course, other implementations are also contemplated. The mesh restorable service process 100, in view of the fact the network 10 and other networks have spare bandwidth, proposes a new service similar to a mesh restorable service, but which not only pre-calculates its mesh restoration route, i.e., the backup path, but actually establishes the backup path on the pre-calculate route, subject to bandwidth availability. Specifically, the mesh restorable service process 100 includes, responsive to a new mesh restorable service request, computing a primary path and establishing the primary path (step 102) and computing a backup path (step 104). If a backup path is not available (step 106), i.e., there is no available bandwidth, the new mesh restorable service has no backup path established nor pre-computed, but will periodically try to acquire a backup path (step 108). The new mesh restorable service which can be called a Mesh Restorable with Backup service only has a backup path established if there is sufficient spare bandwidth in the network. However, the service will periodically retry to acquire a backup path if one cannot be established at step 106. If there is a backup path available (step 106), the mesh restorable service process 100 includes establishing the backup path at a lower priority than the primary path (step 110). Thus, the new mesh restorable service has both the primary path and the backup path established.

Subsequent to steps 108, 110, when there is a fault on the primary path (step 112) and if the backup path is established (step 114), the mesh restorable service process 100 includes switching traffic from the primary path to the backup path quickly (e.g., sub-50 ms) since the backup path is already established, and the priority of the backup path is raised to the priority of the primary path (step 116). If the Mesh Restorable with Backup service has not established its Backup Path (e.g., lack of sufficient spare bandwidth in the network), then it behaves as today's Mesh Restorable service, i.e., it computes a path upon failure and establishes the backup path thereafter yielding sub-second traffic recovery (step 118). If there is not a fault on the primary path (step 112), the mesh restorable service process 100, if no backup path has been established, will periodically retry to acquire a backup path (step 120) by returning to step 106. For example, the time to periodically retry can be a configurable value such as every 30 s or any other interval.

Therefore, in the traffic recovery hierarchy, the Mesh Restorable with Backup service sits somewhere between a Mesh Restorable service and the 1+1 Path Protected service, i.e., at best it offers traffic recovery equivalent to 1+1 Path Protected service (sub-50 ms) and never offers worse traffic recovery than Mesh Restorable service (sub-second). Note that such service differs from the typical 1+1 Path Protected service where the service must always include two paths across the network (Working and Protecting, at the same priority) to guarantee sub-50 ms traffic recovery. It is also different than Mesh Restorable service which only pre-calculates a mesh restoration route, or calculates mesh restoration route only upon failure.

Note that the Mesh Restorable with Backup service allows the network operator to ensure the spare bandwidth in the network is not sitting idle waiting for failures but is utilized, i.e., the spare bandwidth is pre-armed to provide fast traffic recovery for Mesh Restorable with Backup services. It is envisioned that networks will utilize all grades of service, i.e., Mesh Restorable, Mesh Restorable with Backup, 1+1 Path Protected, and in fact, networks will be engineered such that there will always be some truly free bandwidth, i.e., not all spare bandwidth will be used by Backup Paths of the Mesh Restorable with Backup service. Although it is possible to use all of the spare bandwidth since the backup path in the Mesh Restorable with Backup is low priority and thus preemptible.

Note that Mesh Restorable with Backup service's backup path and the service's primary path are tied at the endpoints (source and destination) by the 1+1 Path Protected Bridge & Select constructs to facilitate sub-50 ms switching of traffic from the current path to the backup path when the current path fails, i.e., from this aspect the Mesh Restorable with Backup service is equivalent to the 1+1 Path Protected service.

Preemption of Backup Paths

Of course, the establishment of the backup paths can exhaust the free bandwidth in the network, making it impossible to add new services to the network or worse yet making it impossible to mesh restore the Mesh Restorable services when they experience faults. Thus, the Mesh Restorable with Backup service utilizes preemption capabilities of the network. Specifically, preemption in control planes, SDN, etc. is the process where one service removes another service at a lower priority. In ASON and OSRP, a call is a network-wide connection that supports a service. Calls can be associated with a call attribute, i.e., a connection characteristic, such as a Setup Priority (SP) and a Holding Priority (HP). An SP is a priority with which the SNC establishes itself relative to another SNC. The SP can be used to bump and tear down SNCs with low holding priorities in order to make room for another SNC. An exemplary SP can range from 0 to 7 and may be represented using three bits. An SP of "0" may indicate that the SNC has the highest setup priority while a setup priority of "7" may indicate the lowest setup priority. An SNC setup can take into consideration quality of service constraints, end-to-end delay, delay jitter, bandwidth priority, etc.

An exemplary HP may range from 0 to 7 and may be represented using three bits. An HP is a priority that determines whether an active SNC may be removed or bumped. As such, the setup and holding priority work together to determine bandwidth allocation. By way of example, when setting up an SNC on a link, a determination may be made that bandwidth availability is low. An SP of a new SNC can be compared to an HP of an SNC that is using bandwidth on the link. Although an exemplary setup priority and holding priority ranging from 0 to 7 are described, other values are also contemplated, i.e., the systems and methods can be used with any range of setup and holding priorities.

In GMPLS, when there is insufficient bandwidth to establish a more important LSP, it is possible to tear down a less important existing LSP to free the bandwidth, by preempting the existing LSP. Whether an LSP can be preempted is determined by two properties associated with the LSP, Setup Priority (SP) and Reservation Priority (RP) (which is similar to HP). The SP determines whether a new LSP that preempts an existing LSP can be established. For preemption to occur, the SP of the new LSP must be higher (numerically lower) than the RP of the existing LSP. Also, the act of preempting the existing LSP must produce sufficient bandwidth to support the new LSP. If preempting a single LSP does not suffice then multiple LSPs may be preempted to free up enough bandwidth for the new preempting LSP. That is, preemption occurs only if the new LSP can be set up successfully. The RP determines the degree to which an LSP holds on to its bandwidth reservation after the LSP has been set up successfully. When the RP is high (numerically low), the existing LSP is less likely to give up its reservation, and hence, it is unlikely that the LSP can be preempted. This is described in RFC 5712 "MPLS Traffic Engineering Soft Preemption," (January 2010), the contents of which are incorporated by reference. The foregoing illustration makes reference to SP and HP; those of ordinary skill in the art will recognize it could equally apply to SP and RP or any other prioritization concepts as known in the art.

For illustration purposes, assume 8 SP and HP priority levels, i.e., SP=0 . . . 7 and HP=0 . . . 7. Assume that totally free bandwidth and bandwidth available for SP=7 are equivalent, then the backup paths are routed and established using SP=6, HP=6 in the Mesh Restorable with Backup service. That is, where there is a plurality of priority levels, the backup paths can be set to one lower (numerically higher) than the lowest (numerically higher) priority (i.e., the penultimate priority level) where the lowest (numerically highest) priority is assigned to completely free bandwidth. All other services must use higher (numerically lower) priority levels (SP=0 . . . 5, HP=0 . . . 5) of the plurality of priority levels. Note, that bandwidth occupied by the backup paths appears as available for new services as well as mesh restorations of Mesh Restorable services, i.e., backup paths can be preempted when adding new services to the network or more importantly by mesh restorations of the Mesh Restorable services when they experience faults, due to the priority levels of SP=6, HP=6.

Path computation rules need to be adjusted as well, because backup paths can utilize most if not all of the free bandwidth in the network, i.e., the lowest (numerically highest) priority. To avoid new services from being routed onto grossly non-optimal paths, i.e., only routed on the lowest (numerically highest) priority likely causes non-optimal paths due to the presence of backup paths at the penultimate priority level, new services can immediately attempt to route using their provisioned SP rather than attempting to find a route at SP=7, then SP=6, then SP=5, etc., up to their provisioned SP. Without this adjustment, new services will first try to route using the lowest (numerically highest) priority, which may not be optimal due to the presence of the backup paths at the next lower (numerically higher) priority. For mesh restorations of failed Mesh Restorable services, these services shall attempt to find a route starting at the lowest (numerically highest) SP and moving up, i.e., SP=7, then SP=6, then SP=5, etc., up to their provisioned SP. What the above path computation rules imply is that new services get the most optimal route available in the network at their provisioned SP even if they have to preempt backup paths, while mesh restorations try to avoid preempting backup paths.

Note, when a particular backup path is preempted, the systems and methods contemplate establishment of a new backup path thereafter which is computed based on currently available bandwidth. Note, due to the priority level of the backup path, the backup path is routed on free bandwidth and does not preempt other services. Although, it is contemplated that the backup path could preempt other backup paths whose primary paths have a lower (numerically higher) priority.

Activation of Backup Paths

When backup paths are "activated," i.e., Mesh Restorable with Backup service's current path fails and the traffic is switched to the backup path, the backup path becomes the service's current path, and its priority is upgraded to the provisioned service's priority (SP=0 . . . 5, HP=0 . . . 5). Note, the terminology herein refers to primary and backup paths, but these can be interchangeable based on where the active traffic is, i.e., the current path. Note that when backup paths are "activated," they then become service's current path and hold on to network bandwidth using service's provisioned HP (HP=0 . . . 5), and if such paths fail (and there is no subsequent backup path), then such paths are routed using service's provisioned SP (SP=0 . . . 5)

One problem that needs to be overcome by the Mesh Restorable with Backup service is to ensure that its backup path is not preempted by mesh restoration paths belonging to the Mesh Restorable services in case both types of services experience fault at the same time. That is, when the Mesh Restorable with Backup service and Mesh Restorable service sit on the same link and that link fails, then it is not desirable for the backup path of the Mesh Restorable with Backup service to be preempted by the mesh restoration path of the Mesh Restorable service. To solve the above-mentioned problem, the backup path's priority (HP=6) needs to expeditiously upgrade to the provisioned value for the service (HP=0 . . . 5). This can be done through a variety of techniques.

First, this can be done using the data path and mechanisms described in G.873.1 "Optical transport network (OTN): Linear protection," (May 2014), the contents of which are incorporated by reference herein. That is, use the Automatic Protection Switching (APS) Channel's RequestedSignal field to convey the priority of the service's backup path, i.e. initially RequestedSignal conveys HP=255 (Extra Traffic) or HP=6, and after the traffic is switched to the Backup Path, then RequestedSignal conveys service's provisioned HP (HP=0 . . . 5). Note that since RequestedSignal=0 actually has a specific meaning (Null Traffic) in G.873.1, then it is necessary to offset the signaled HP value by one, i.e., rather than signaling RequestedSignal for HP=7, signal for HP=8, and similarly rather than signaling RequestedSignal for HP=0 . . . 5, signal for HP=1 . . . 6.

Second, this can be done using the data path and one of the OTN Tandem Connection Monitors (TCMs) to convey the priority of the service's backup path, i.e., initially TCM conveys HP=6, and after the traffic is switched to the backup path, then TCM conveys service's provisioned HP (HP=0 . . . 5). A third option can include control plane signaling, such as a Notify Message or the like to upgrade the priority of the service's backup path. Note, the first and second approaches both use the data path, such as via overhead and are thus extremely quick and efficient to raise the priority. Also, for the first and second approaches, using data plane signaling, this change also needs to be conveyed to the control plane. That is, when RequestedSignal's or TCM's signaled value changes, the data plane must inform the control plane of the change in the HP of the service. This is needed so that the control plane can mark its Connection Records (Control Plane state) accordingly and also trigger appropriate Routing/Interior Gateway Protocol (IGP) Link bandwidth update. For example, when an ODU2 backup path was activated and upgraded from HP=6 to HP=3, there is now ODU2 less available b/w for SP=6, SP=5, SP=4, SP=3 and thus a link bandwidth update needs to be flooded throughout the network.

Software Defined Networking (SDN)

While the systems and methods thus far have been described with reference to control planes, the systems and methods also contemplate operation in a centralized control environment such as SDN or in a hybrid control environment (SDN+control plane). Here, the SDN controller or the like can maintain the priority of the backup paths, provide path computation and preemption.

It is also contemplated that network operators can manually invoke the systems and methods. For example, a service may have failed too many times in the past month and accumulated 500 ms of traffic outage, and its contracted Service Level Agreement (SLA) was for less than 700 ms outage per month, accordingly, the network operator can convert the service to a Mesh Restorable with Backup service with a pre-established backup path so that the next failure will be sub-50 ms, thereby preserving the SLA.

Exemplary Operation

Figure 5:
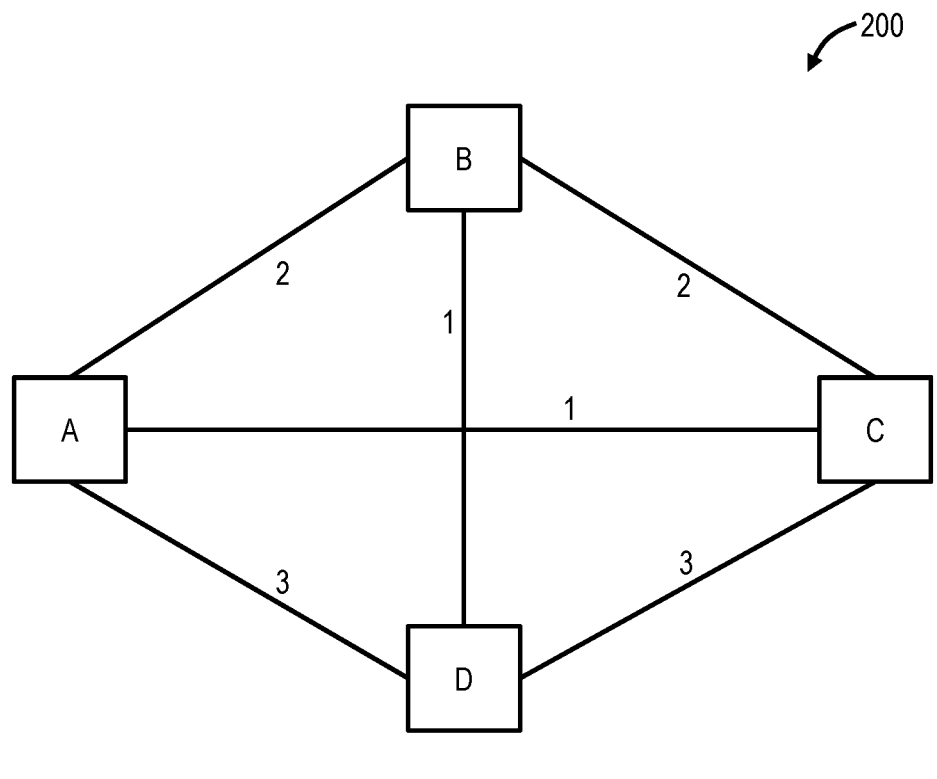
FIGS. 5-17 are network diagrams of an exemplary operation of the mesh restorable service process with preemptible established backup paths in a network.
Figure 6:
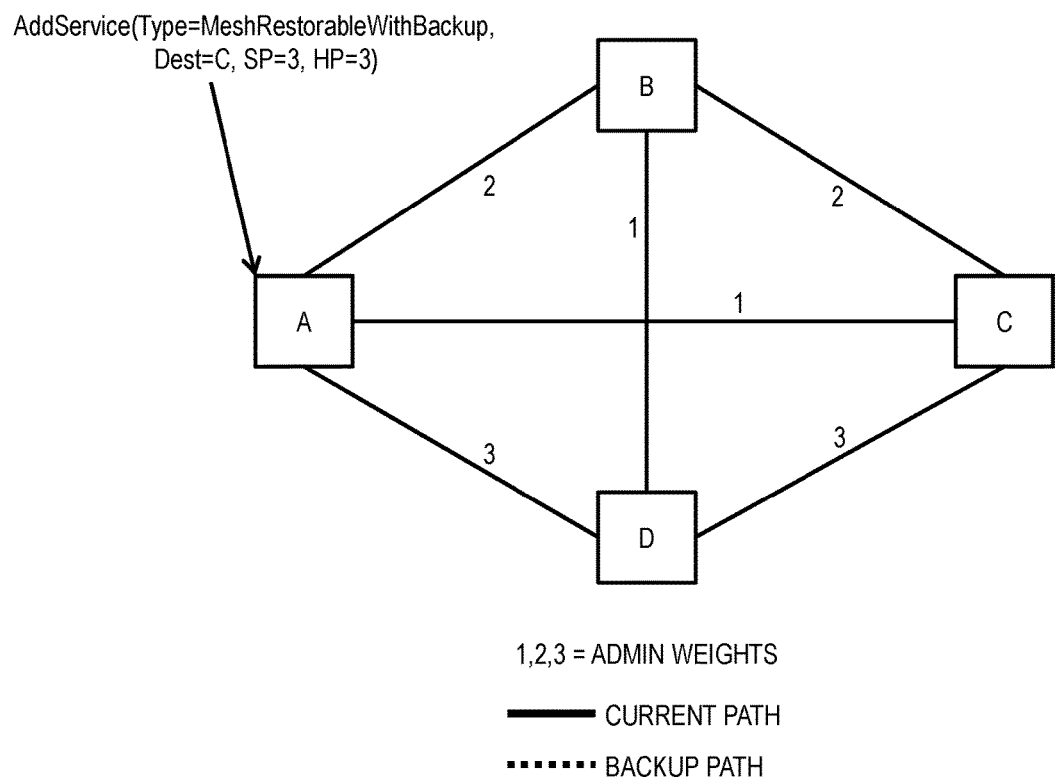
Figure 7:
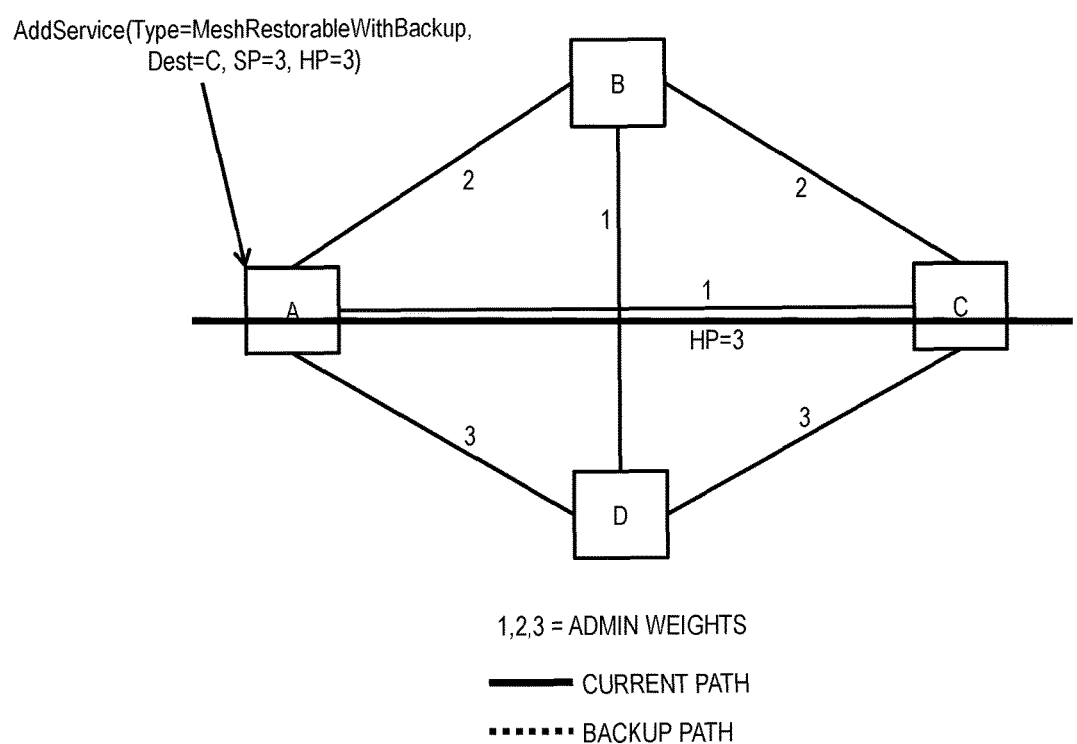
Figure 8:
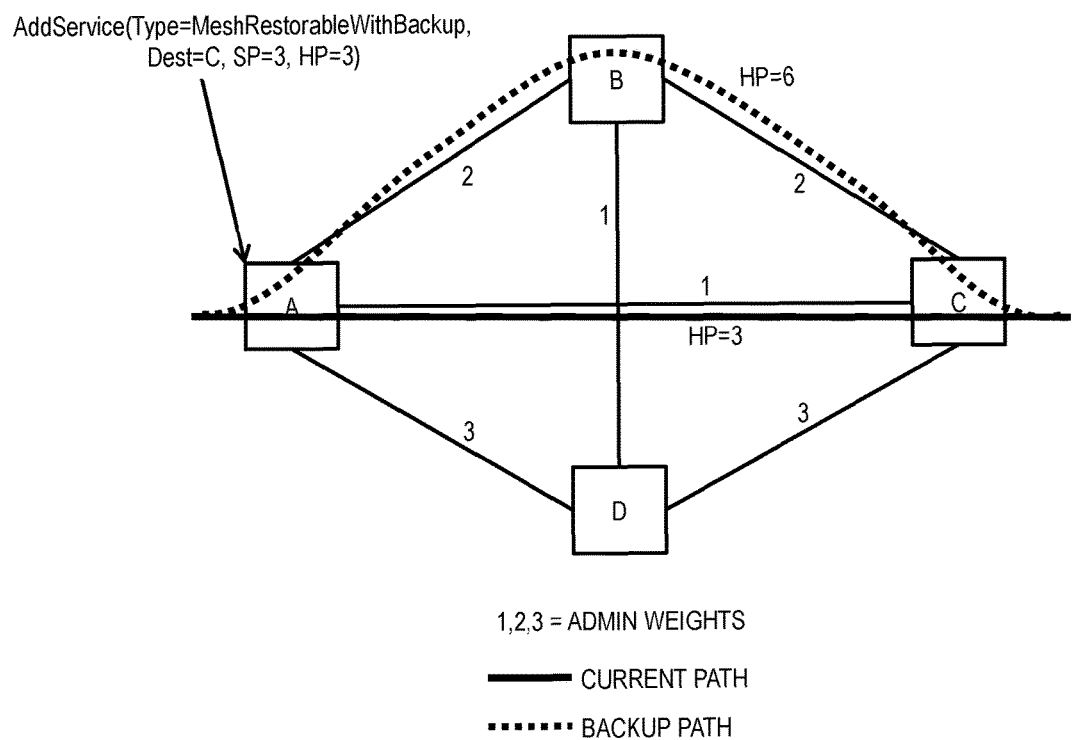

Referring to FIGS. 5-17, in an exemplary embodiment, network diagrams of a network 200 illustrate an exemplary operation of the mesh restorable service process with preemptible established backup paths in a network. For illustration purposes, in FIG. 5, the network 200 includes four nodes A, B, C, D in an interconnected mesh with associated administrative weights. The administrative weights are used in path computation for lowest cost routing. For example, a route between nodes B, D would ideally go direct with an administrative weight of 1 versus through node A with an administrative weight of 5. In FIG. 6, a new service request is received at node A, i.e., AddService(Type=MeshRestorableWithBackup, Dest=C, SP=3, HP=3). Here, the service request is for a Mesh Restorable with Backup service from node A to node C with SP=3, HP=3. In FIG. 7, the primary path is routed direct between nodes A, C with an administrative weight of 1 and an HP=3. In FIG. 8, the backup path is routed between nodes A, B, C with an administrative weight of 4 and an HP=6.

Figure 9:
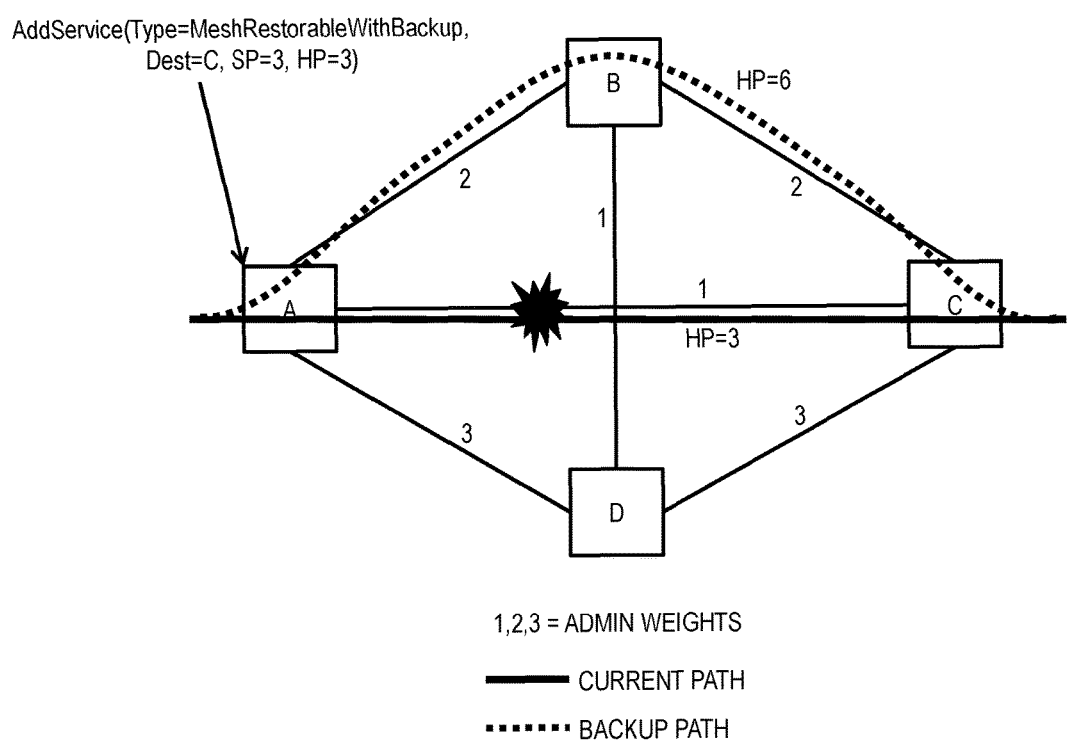
Figure 10:
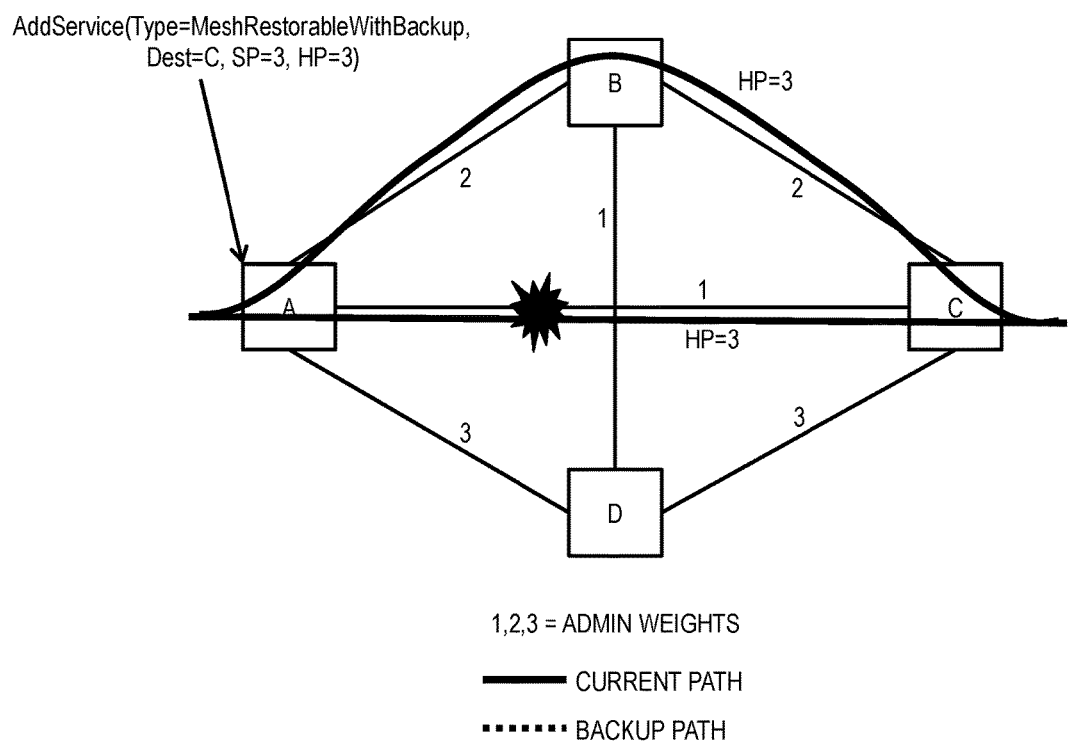
Figure 11:
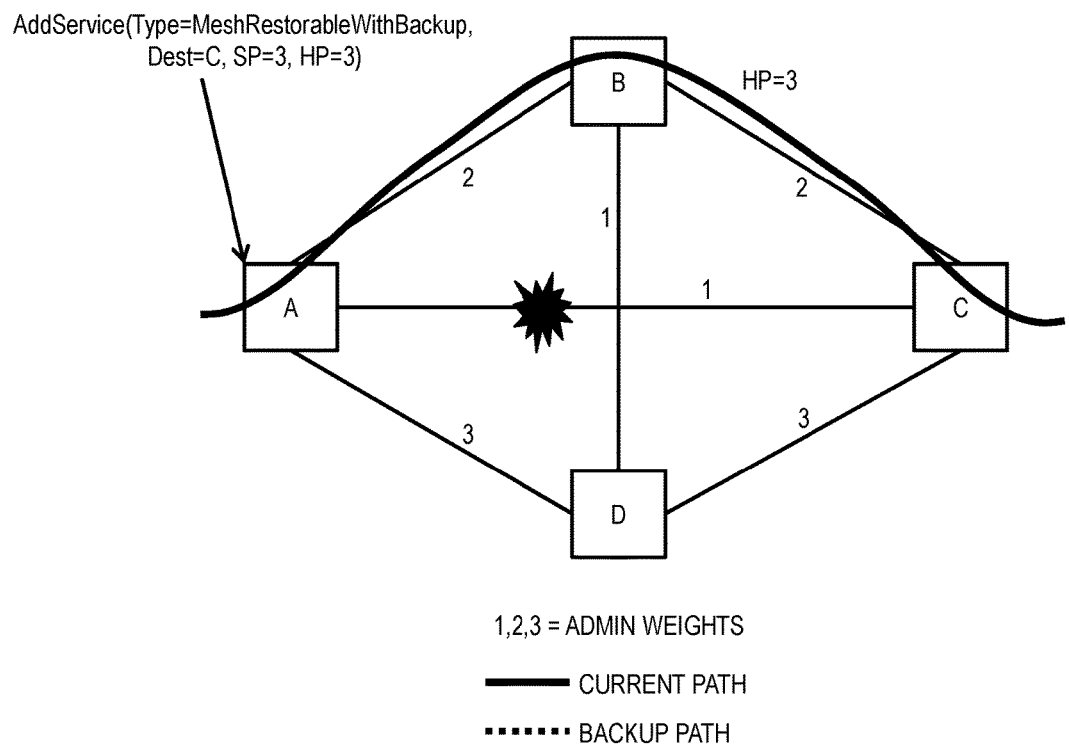
Figure 12:
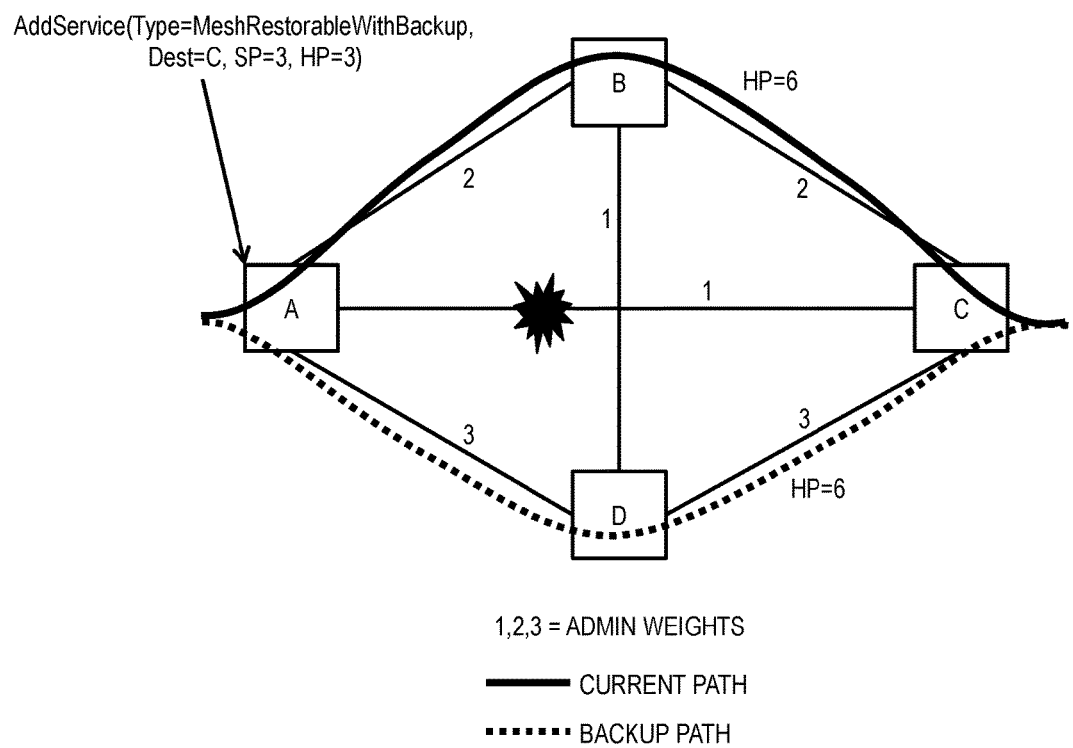
Figure 13:
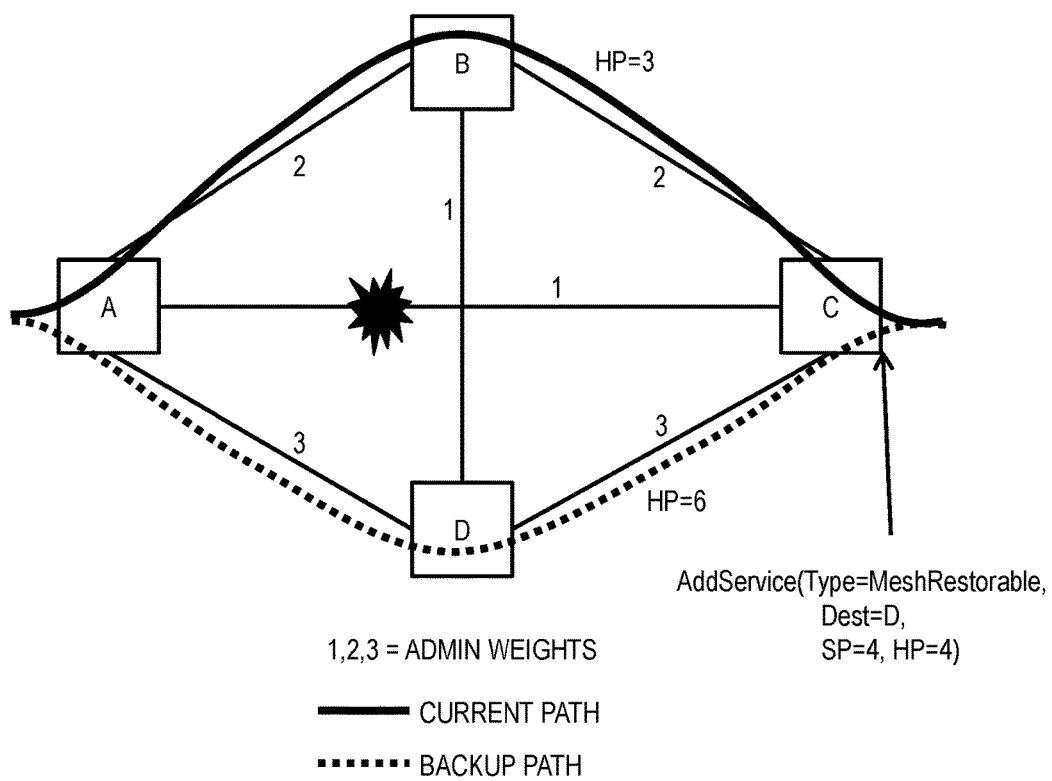

In FIG. 9, the primary path experiences a fault. In FIG. 10, the backup path between nodes A, B, C becomes the current path and changes its priority to HP=3, equal to the priority of the original, failed primary path. In FIG. 11, the original, failed primary path is removed. In FIG. 12, a new backup path is established between the nodes A, D, C with an administrative weight of 6 and the HP=6. In FIG. 13, another new service request is received at node C, i.e., AddService(Type=MeshRestorable, Dest=D, SP=4, HP=4). Here, the service request is for a Mesh Restorable service (not one with a pre-established backup path) between nodes C, D with SP=4. HP=4, i.e., lower (numerically higher) priority than the Mesh Restorable with Backup service. For illustration purposes, it is assumed the Mesh Restorable service and the Mesh Restorable with Backup service cannot be routed over the same links due to bandwidth size.

Figure 14:
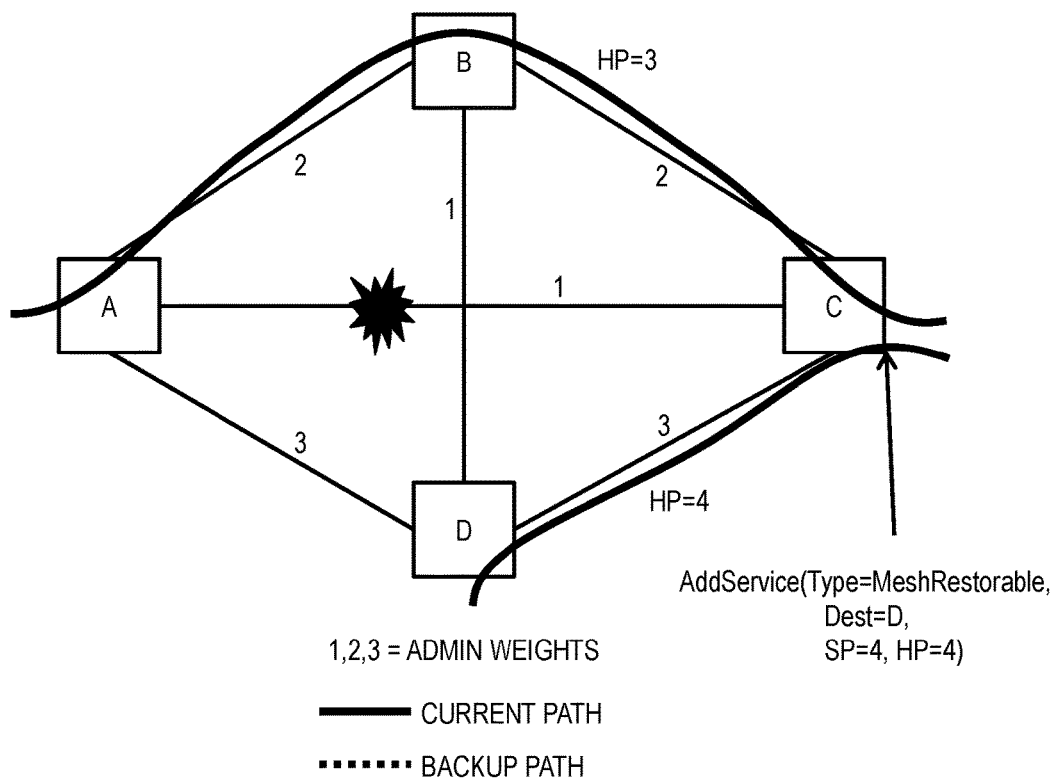
Figure 15:
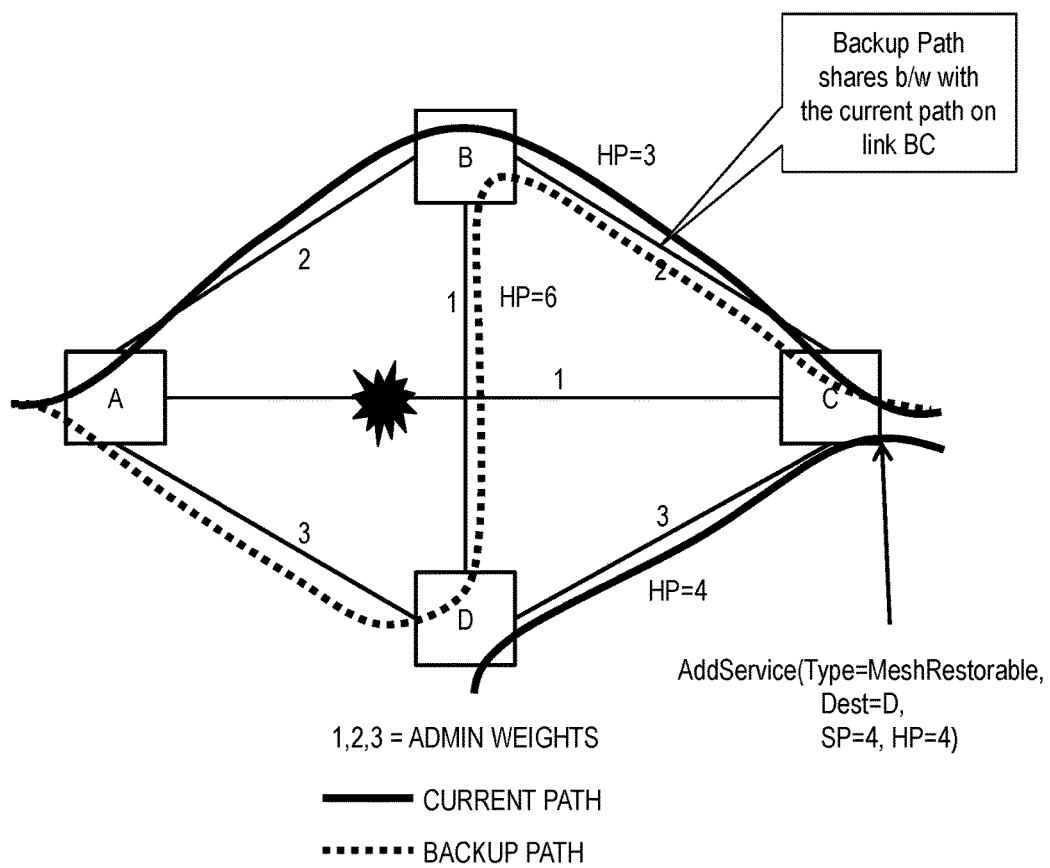
Figure 16:
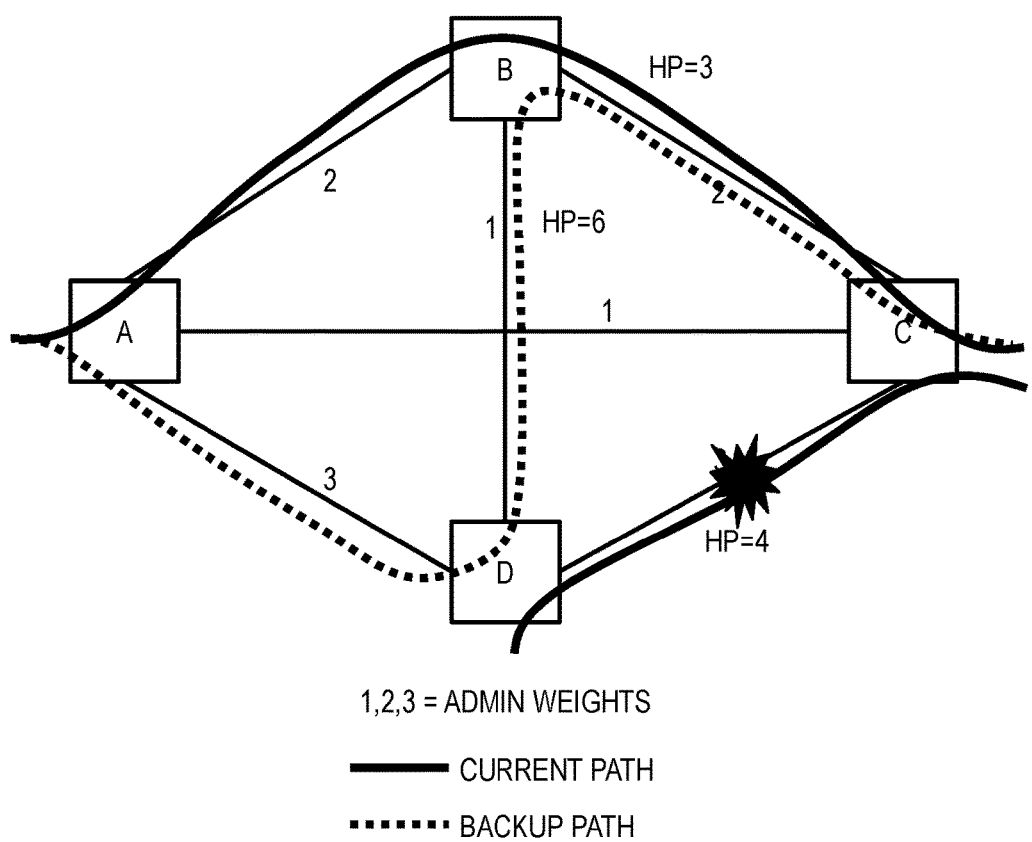
Figure 17:
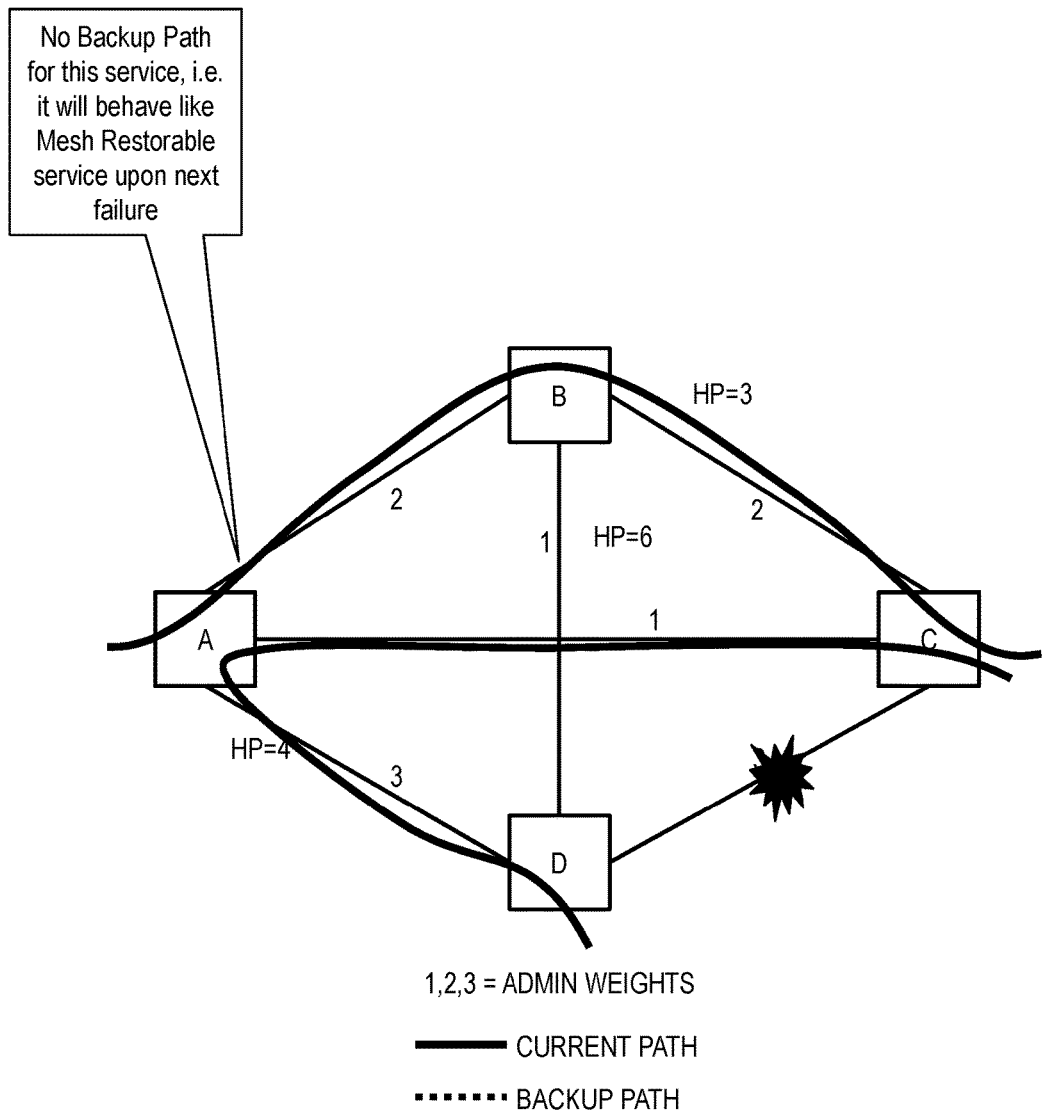

In FIG. 14, the Mesh Restorable service preempts the backup path between the nodes C, D for the Mesh Restorable with Backup service since the Mesh Restorable service has an SP=4 and the backup path has HP=6 and the new service is routed in the network between nodes C and D with an administrative weight of 3 and HP=4 . . . . In FIG. 15, the Mesh Restorable with Backup service has a new backup path established between nodes A, D, B, C with an administrative weight of 6 and HP=6. Note, the backup path here shares bandwidth with the current path on the link between the nodes B, C. In FIG. 16, the original fault between the nodes A, C has cleared, and a new fault occurs between the nodes C, D affecting the Mesh Restorable service. In FIG. 17, the Mesh Restorable service is restored between the nodes D, A, C, preempting the backup path for the Mesh Restorable with Backup service. Here, it is no longer possible to establish a backup path for the Mesh Restorable with Backup service due to the routing of the Mesh Restorable service. Accordingly, the Mesh Restorable with Backup service now behaves like the Mesh Restorable service from a restoration perspective.

Dynamically Adapting Connection Holding Priority

Conventionally, in GMPLS, ASON, and the like, HPs are static, i.e., do not change over time for a connection. That is, the HP is assigned at connection setup. Fixed, non-amendable HP does not allow for differentiation between connections with identical nominal HP values. It is thus possible that connections which have no alternate route get preempted instead of connections which, when preempted, could have found alternative routes. Furthermore, it would not be possible to differentiate between connection paths that are actively carrying traffic and paths that are not actively carrying traffic, such as the backup path for the Mesh Restorable with Backup service.

Figure 18:
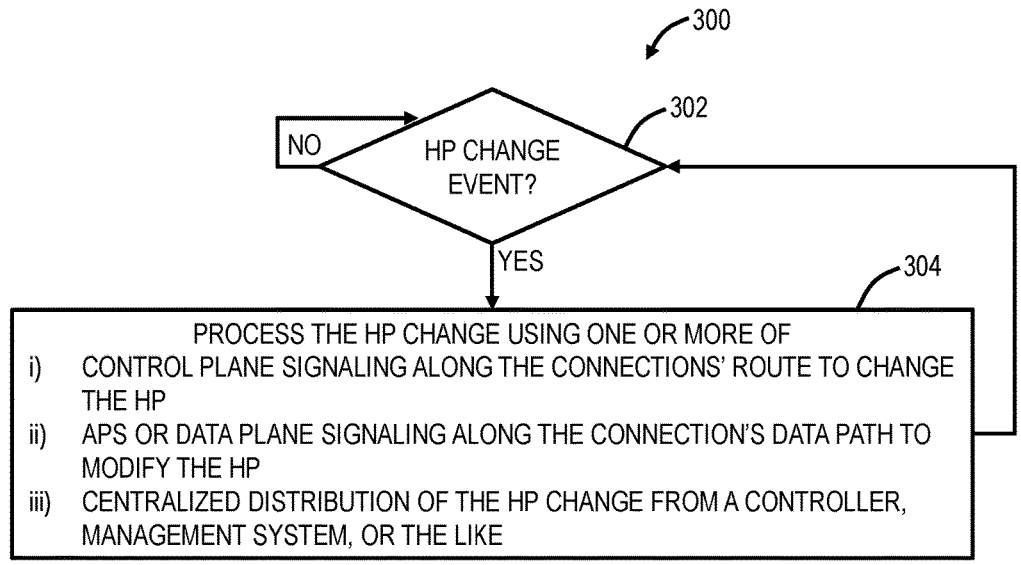
FIG. 18 is a flowchart of a process for dynamically adapting HP for a connection based on an HP change event.

Referring to FIG. 18, in an exemplary embodiment, a flowchart illustrates a process 300 for dynamically adapting HP for a connection based on an HP change event. The process 300 contemplates operation with the mesh restorable service process 100, the Mesh Restorable with Backup service, and the like. Also, the process 300 can be utilized independently of the mesh restorable service process 100 and the Mesh Restorable with Backup service, such as to dynamically adjust a connection's HP based on the connection and/or network state to make the connection more or less amenable to preemption. Again, it is more desirable to preempt a connection which could find an alternate path than to have a connection fail due to no available routes in the network. That is, the process 300 can generally dynamically adjust a connection's HP for a variety of reasons, including a backup path with low priority becoming active as well as connection and/or network state changes causing the desired change in the connection's HP for preemptability.

The process 300 includes detecting an HP change event (step 302), and responsive to the HP change event, processing the HP change using one or more of i) control plane signaling along the connection's route to change the HP, ii) APS or data plane signaling along the connections' data path to modify the HP, and/or iii) centralized distribution of the HP change from a controller, management system, or the like (step 304). The HP change event can be raising or lowering the HP priority based on one or more reasons.

One example of the HP change event can include the backup path in the Mesh Restorable with Backup service becoming active, as described herein. A connection's backup path's HP is adjusted/upgraded to match the provisioned value of the active or primary path when the backup path is activated, i.e., traffic is switched to it, as described herein. Such upgrade to the HP ensures an activated and traffic carrying backup path is not preempted, which would have been permitted and could happen if the backup path was not being utilized (was not active) and remained with the lower (numerically higher) HP.

Another example of the HP change event can include the number of alternate routes available for the connection in case of failure or preemption. This includes network state changes. Of course, the network 10 continually has connections added and released. The objective here is to raise/lower the HP based on the connection's alternatives given the current network state. For example, if a particular connection has many alternate routes to reroute to as a result of failure or preemption, then its HP may be safely set to a lower priority (numerically higher) value than say a connection which has no or fewer alternate routes. The rationale is that a connection with many alternatives is preferred to be preempted rather than a connection with no or fewer alternatives. Here, the process 300 can be used to adapt dynamically HPs for existing connections based on their alternate options. The determination of the alternate routes can be determined by a controller, a Path Computation Element (PCE), a planning system, a management system, etc. which can create the HP change event based on the continuous or periodic processing of the connections in the network 10. This exemplary embodiment treats HP as a dynamic parameter which changes over time responsive to the network state. Again, the objective is to make preemption more amenable to connections with more alternatives. Thus, HP is not static, fixed to the original value, but rather a variable depending on the state of the connection and/or the state of network resources. Note, each connection may be configured to use this functionality, with the ability to prevent HP changes to high priority connections which are not amenable to preemption regardless of the network state.

Figure 19:
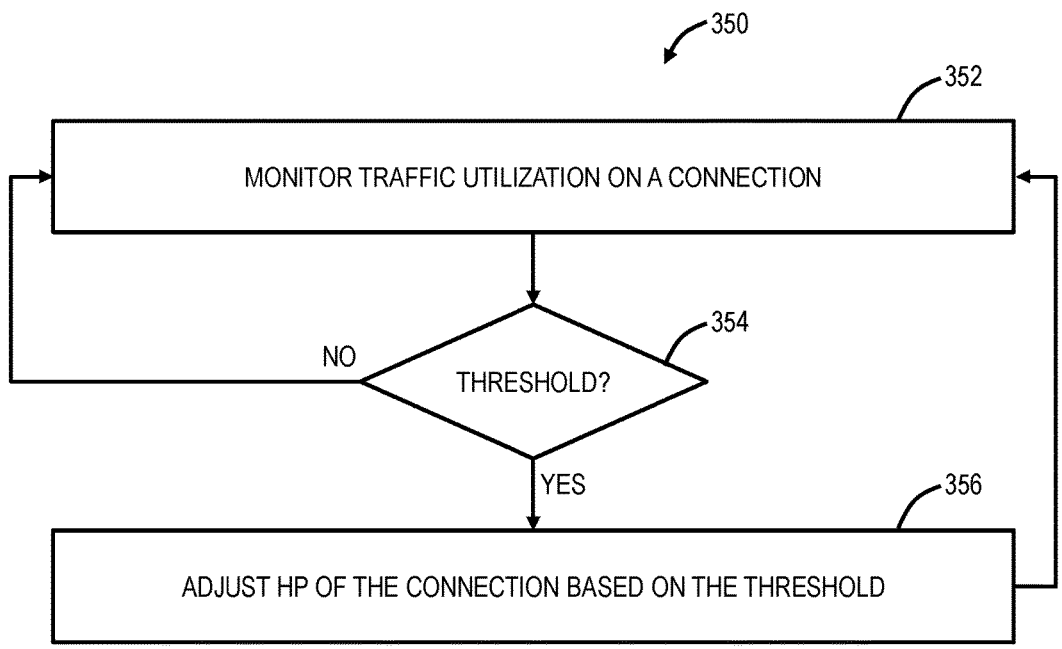
FIG. 19 is a flowchart of a process for detecting an HP change event, for the process of FIG. 18, based on monitoring traffic utilization on the connection.

A further example of an HP change event can include changes in traffic utilization on the connection as described in additional detail in FIG. 19. Referring to FIG. 19, in an exemplary embodiment, a flowchart of a process 350 for detecting an HP change event, for the process of FIG. 18, based on monitoring traffic utilization on the connection. The process 350 includes monitoring traffic utilization on a connection (step 352) to detect a threshold (step 354), and responsive to the threshold being detected, adjusting the HP of the connection based on the threshold (step 356). The traffic utilization can be at Layer 2 or above whereas the connection can be at Layer 0 (wavelength) and/or Layer 1 (TDM such as OTN). The rationale here is that connections with lower utilization or no utilization can support lower priorities, thus making them amenable to preemption. The threshold can be configurable and generally determines whether or not there is low or no utilization on the connections.

Yet another further example of an HP change event is where a connection has path protection and when a state of a protect path changes in the path protection. Here, any connection with working path protection can operate safely with low priority from a mesh restoration perspective (for delayed mesh restoration) since any fault would be handled by the path protection. However, if the path protection is unavailable, it is desirable to raise the priority to high priority (for immediate mesh restoration).

Referring back to FIG. 18, the control plane signaling can include sending a message via the control plane through all nodes in the connection's route to change the HP. The message can be originated by a source or originating node, sent to the destination or terminating node through all intermediate nodes. The APS or data plane signaling can use overhead associated with the connection, such as the APS overhead or other overhead, such as in an OTN frame. The overhead is processed at each node along the data path of the connection. When APS or data plane signaling is used for changing HP of a connection then control plane state of the connection needs to be changed accordingly at every node so that control plane can make the correct preemption decisions which are based on the HP stored in the connection's control plane state. The centralized distribution can include a message sent from the controller (e.g., the SDN controller), the management system, or the like. Note, the process 300 includes using more than one of the aforementioned techniques, such as the centralized distribution to the source node, then control plane or data plane signaling therefrom.

Dynamic Adjustment of Connection Priority for Restoration

Figure 20:
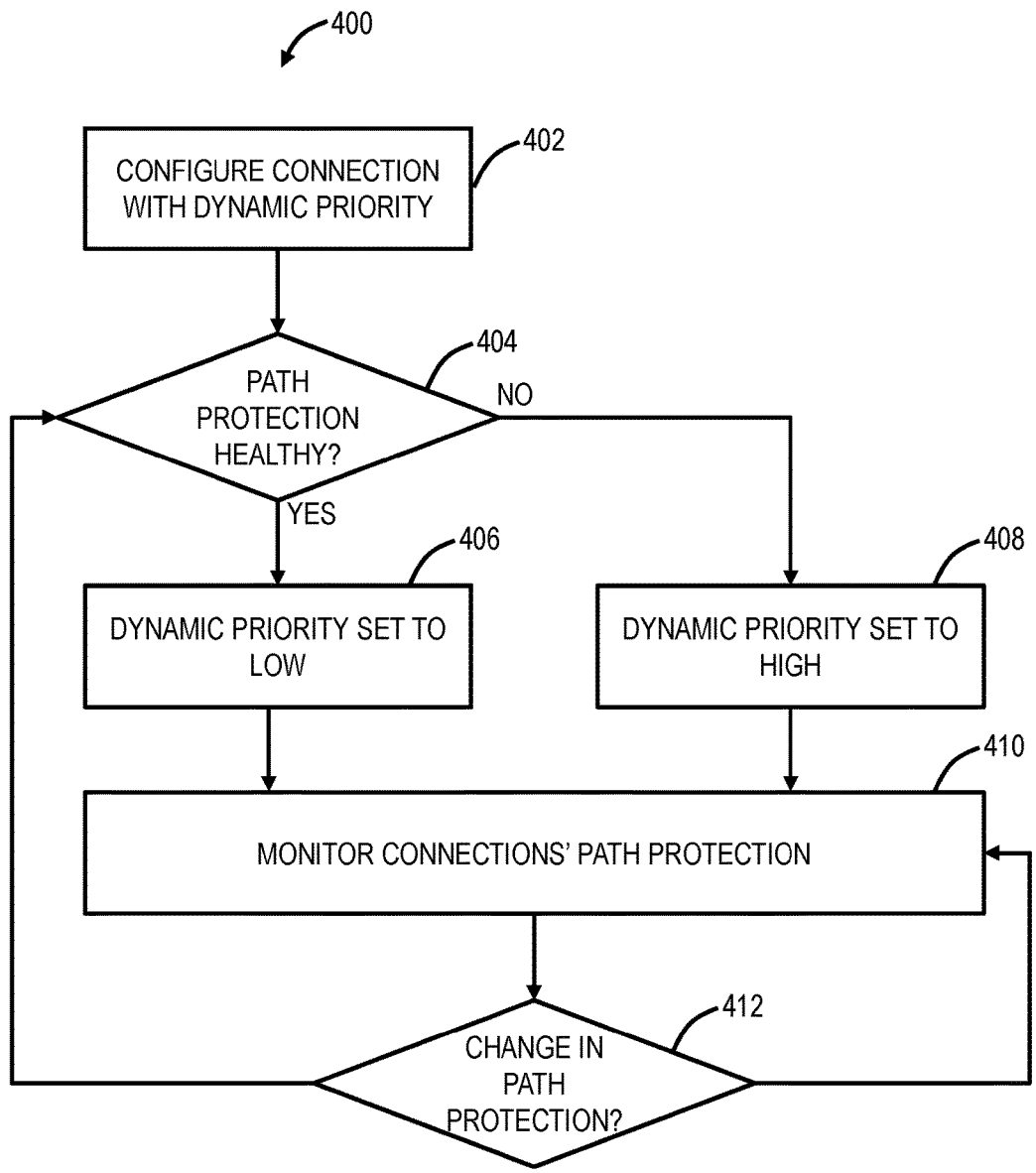
FIG. 20 is a flowchart of a dynamic adjustment process for connection priority based on restoration attributes.

Referring to FIG. 20, in an exemplary embodiment, a flowchart illustrates a dynamic adjustment process 400 for connection priority based on restoration attributes. The dynamic adjustment process 400 contemplates operation with the nodes 12 in the networks 10, 200 to change any type of priority assigned to a connection, e.g., an SNC, LSP, etc. at Layers 0, 1, and/or 2. In an exemplary embodiment, the priority is any attribute which determines restoration priority. For example, the priority can be low or high with low priority constituting delayed mesh restoration such as based on a hold off period and high priority constituting immediate mesh restoration. In another exemplary embodiment, the priority can be the HP as described herein with restoration determined based on the HP values. Of course, other types of priority are contemplated herein.

The dynamic adjustment process 400 can begin at service creation or at any time where a connection is configured with dynamic priority (step 402). The dynamic priority is one that changes based on various factors in the network, i.e., not a static priority that is fixed for the duration of the connection. The configuration of the connection can be by an operator, through an NMS/EMS, via SDN, through the control plane, etc. In an exemplary embodiment, the priority of the connection is provided to the nodes 12 in the network 10, 200 via control plane signaling, via overhead, or the like. For example, in an exemplary embodiment, the priority of a connection can be updated on all associated links using Make-Before-Break (MBB). This MBB is a signaling event that only changes the priority attribute of the connection and is thus non-service affecting, i.e., this change is in-service and does not impact the traffic on the connection. The objective of this configuration step is to ensure all nodes 12 associated with a connection have objects associated with the connection showing the current priority.

The subsequent steps in the dynamic adjustment process 400 relate to how the dynamic priority changes and is based on restoration attributes. The systems and methods contemplate dynamic priority for any reason to provide improved efficiency and intelligence in the network and restoration is merely an exemplary embodiment. In the dynamic adjustment process 400, the connection is assumed to have path protection or some other protection mechanism. Accordingly, it is not necessary for the connection to have high priority to provide adequate restoration attributes. Rather, the connection will first be restored by the path protection, which is quicker than mesh restoration. However, it is also assumed this connection is important and should have high priority if the path protection is unavailable. Again, this is an exemplary use case of the dynamic priority.

The dynamic adjustment process 400 includes checking if the path protection (or other protection mechanism) is healthy, i.e., working, available, and with minimal errors, faults, or the like—the path protection is valid and in good health (step 404). If the path protection is valid and in good health (step 404), the dynamic adjustment process 400 treats the connection as low priority, i.e., the dynamic priority is set to low or the like (step 406). That is, the control plane treats the connection as a low priority connection since, responsive to a fault, switching to the protection path would recover the connection and keeping the connection as low priority would only give other needier connections better opportunity to mesh restore.

If the path protection is invalid or in poor health (step 404), the dynamic priority of the connection is set to high or the like (step 408). Here, the connection does not have the path protection for backup and since it is assumed the connection is high priority, the connection would need to mesh restore immediately subsequent to a fault.

For both steps 406, 408, the connection's priority can be set initially upon service creation based on the step 404 or changed later through control plane signaling updates (e.g., using MBB or the like) to signal all nodes associated with the connection. The nodes associated with the connection contain an object attribute of the current priority of the connection based on the currently set dynamic priority. An intermediate node of the connection can use this object attribute to determine the mesh restoration behavior in the event of a fault, e.g., immediately release a high priority connection for mesh restoration or delay release of a low priority connection for delayed mesh restoration.

Subsequent to steps 406, 408, the dynamic adjustment process 400 includes monitoring the connections' path protection (step 410). Step 410 is similar to step 404 and check the current state of the protect path, i.e., is the path protection valid and in good health or is the path protection invalid or in poor health. The dynamic adjustment process 400 waits until there is a change in the path protection based on the monitoring step 410 (step 412). If there is a change (step 412), the dynamic adjustment process 400 returns to step 404 to readjust the dynamic priority.

For example, assume the connection is established with valid path protection, the connection would be set to low priority. However, as soon as any node 12 associated with the connection detects that protection path does not exist or is no longer in good health, it would initiate signaling to convert connection from low priority (delayed mesh) to high priority (immediate mesh) type across all hops trough MBB signaling (since only priority parameter would be changed it would be hitless). Again, this capability of a control plane connection dynamically adapting its priority to recover traffic immediately when its status is unprotected, would give other needier connections chance to recover uncontested, resulting in more optimal network traffic recovery performance. Similarly, when the control plane detects the connection is again protected, after a path stability hold off, it would degrade its priority from high to low through MBB signaling (again hitless in this case, since only priority being modified without disrupting cross-connects (XCON)).

In an exemplary embodiment, the connection can be a L1 TDM connection such as an OTN connection. Here, the connection can include Automatic Protection Switching (1+1) for path protection as well as mesh restoration when the path protection is unavailable. The path protection can also be at different network layers for the connection. For example, the dynamic priority can be for a L1 TDM connection to mesh restore. However, the L0 wavelength carrying the L1 TDM connection can have a L0 optical protection scheme. In this case, any fault can be first handled by the L0 optical protection scheme and the dynamic adjustment process 400 can mark the L1 TDM connection with dynamic priority set based on the state of the L0 optical protection scheme, i.e., L0 optical protection scheme available—priority for the L1 TDM connection is low, and conversely, L0 optical protection scheme unavailable—priority for the L1 TDM connection is high.

Dynamic Priority Adjustment Process

Figure 21:
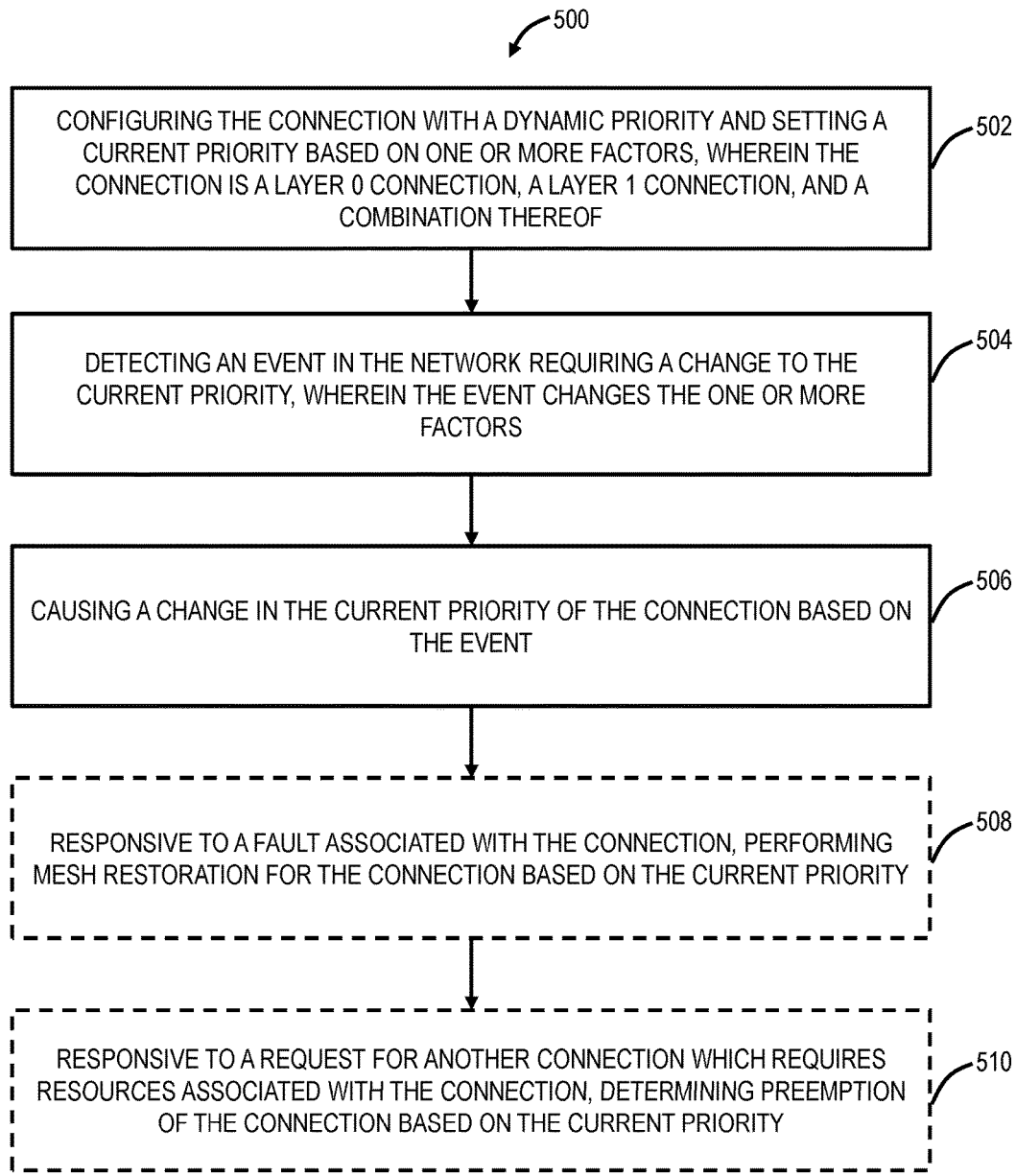
FIG. 21 is a flowchart illustrates a process for dynamic adjustment of a connection's priority in a network.

Referring to FIG. 21, in an exemplary embodiment, a flowchart illustrates a process 500 for dynamic adjustment of a connection's priority in a network. The process 500 includes configuring the connection with a dynamic priority and setting a current priority based on one or more factors, wherein the connection is a Layer 0 connection, a Layer 1 connection, and a combination thereof (step 502); detecting an event in the network requiring a change to the current priority, wherein the event changes the one or more factors (step 504); and causing a change in the current priority of the connection based on the event (step 506). The process 500 can include, responsive to a fault associated with the connection, performing mesh restoration for the connection based on the current priority (step 508). The process 500 can include, responsive to a request for another connection which requires resources associated with the connection, determining preemption of the connection based on the current priority (step 510).

The causing the change can include one of control plane signaling and data plane signaling along the connection's path in the network to change the current priority at each node in the path, and centralized distribution of the change to each node in the path from one of a controller and a management system. The causing can update a priority attribute at each node along the connection's path and is non-service affecting. The current priority can be utilized to determine mesh restoration behavior for the connection, wherein the connection can have one of path protection and another protection mechanism in addition to mesh restoration, and wherein the requiring the change can be based on a state of one of the path protection and the another protection mechanism. The connection can be a Layer 1 connection which is on a Layer 0 connection supporting an optical protection scheme, and wherein the current priority can be set based on the event including a change in state of the optical protection scheme.

The connection can include a backup path for another connection, and wherein the event can include the connection becoming active for the another connection. The event can include network state changes which affect a number of alternate routes for the connection in case of failure and preemption. The event can include changes in traffic utilization on the connection where current priority is set based on an amount of the traffic utilization.

In another exemplary embodiment, an apparatus adapted to dynamically adjust a connection's priority in a network includes circuitry adapted to configure the connection with a dynamic priority and setting a current priority based on one or more factors, wherein the connection is a Layer 0 connection, a Layer 1 connection, and a combination thereof; circuitry adapted to detect an event in the network requiring a change to the current priority, wherein the event changes the one or more factors; and circuitry adapted to cause a change in the current priority of the connection based on the event.

In a further exemplary embodiment, a node adapted to dynamically adjust a connection's priority in a network includes one or more ports; and a controller communicatively coupled to the one or more ports, wherein the controller is adapted to configure the connection with a dynamic priority and setting a current priority based on one or more factors, wherein the connection is a Layer 0 connection, a Layer 1 connection, and a combination thereof, detect an event in the network requiring a change to the current priority, wherein the event changes the one or more factors, and cause a change in the current priority of the connection based on the event.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An apparatus adapted to dynamically adjust a connection's priority in a network, the apparatus comprising:
   circuitry adapted to configure the connection with a dynamic priority and setting a current priority based on one or more factors, wherein the connection is a Layer 0 connection, a Layer 1 connection, and a combination thereof;
   circuitry adapted to detect an event in the network requiring a change to the current priority, wherein the event changes the one or more factors; and
   circuitry adapted to cause a change in the current priority of the connection based on the event,
   wherein the connection is a backup path for another connection, and wherein the event is the connection becoming active for the another connection.

2. The apparatus of claim 1, further comprising:
   circuitry adapted to perform mesh restoration for the connection based on the current priority responsive to a fault associated with the connection.

3. The apparatus of claim 1, further comprising:
   circuitry adapted to determine preemption of the connection based on the current priority responsive to a request for another connection which requires resources associated with the connection.

4. The apparatus of claim 1, wherein the circuitry adapted to cause the change uses one of
   one of control plane signaling and data plane signaling along the connection's path in the network to change the current priority at each node in the path, and
   centralized distribution of the change to each node in the path from one of a controller and a management system.

5. The apparatus of claim 1, wherein the circuitry adapted to cause the change updates a priority attribute at each node along the connection's path and is non-service affecting.

6. The apparatus of claim 1, wherein the current priority is utilized to determine mesh restoration behavior for the connection, wherein the connection has one of path protection and another protection mechanism in addition to mesh restoration, and wherein the requiring the change is based on a state of one of the path protection and the another protection mechanism.

7. The apparatus of claim 1, wherein the connection is a Layer 1 connection which is on a Layer 0 connection supporting an optical protection scheme, and wherein the current priority is set based on the event comprising a change in state of the optical protection scheme.

8. The apparatus of claim 1, wherein the event comprises network state changes which affect a number of alternate routes for the connection in case of failure and preemption.

9. The apparatus of claim 1, wherein the event comprises changes in traffic utilization on the connection where current priority is set based on an amount of the traffic utilization.

10. An apparatus adapted to dynamically adjust a connection's priority in a network, the apparatus comprising:
    circuitry adapted to configure the connection with a dynamic priority and setting a current priority based on one or more factors, wherein the connection is a Layer 0 connection, a Layer 1 connection, and a combination thereof;
    circuitry adapted to detect an event in the network requiring a change to the current priority, wherein the event changes the one or more factors; and
    circuitry adapted to cause a change in the current priority of the connection based on the event,
    wherein the current priority is utilized to determine mesh restoration behavior for the connection, wherein the connection has one of path protection and another protection mechanism in addition to mesh restoration, and wherein the requiring the change is based on a state of one of the path protection and the another protection mechanism.

11. The apparatus of claim 10, further comprising:
    circuitry adapted to perform the mesh restoration for the connection based on the current priority responsive to a fault associated with the connection.

12. The apparatus of claim 10, wherein the circuitry adapted to cause the change utilizes one of control plane signaling and data plane signaling along the connection's path in the network to change the current priority at each node in the path.

13. The apparatus of claim 10, wherein the circuitry adapted to cause the change updates a priority attribute at each node along the connection's path and is non-service affecting.

14. The apparatus of claim 10, wherein the connection is a Layer 1 connection which is on a Layer 0 connection supporting an optical protection scheme, and wherein the current priority is set based on the event comprising a change in state of the optical protection scheme.

15. The apparatus of claim 10, wherein the event comprises network state changes which affect a number of alternate routes for the connection in case of failure and preemption.

16. The apparatus of claim 10, wherein the event comprises changes in traffic utilization on the connection where current priority is set based on an amount of the traffic utilization.

17. A node adapted to dynamically adjust a connection's priority in a network, the node comprising:
 one or more ports; and
 a controller communicatively coupled to the one or more ports, wherein the controller is adapted to
  configure the connection with a dynamic priority and setting a current priority based on one or more factors, wherein the connection is a Layer 0 connection, a Layer 1 connection, and a combination thereof,
  detect an event in the network requiring a change to the current priority, wherein the event changes the one or more factors, and
  cause a change in the current priority of the connection based on the event,
 wherein the connection is a Layer 1 connection which is on a Layer 0 connection supporting an optical protection scheme, and wherein the current priority is set based on the event comprising a change in state of the optical protection scheme.

18. The node of claim 17, wherein the controller is further adapted to perform the mesh restoration for the connection based on the current priority responsive to a fault associated with the connection.

19. The node of claim 17, wherein the controller is further adapted to utilize one of control plane signaling and data plane signaling along the connection's path in the network to change the current priority at each node in the path.

20. The node of claim 17, wherein the controller is further adapted to update a priority attribute at each node along the connection's path and is non-service affecting.

* * * * *